United States Patent
Lee et al.

(10) Patent No.: US 12,200,776 B2
(45) Date of Patent: Jan. 14, 2025

(54) METHOD FOR TRANSMITTING AND RECEIVING SIGNAL IN WIRELESS COMMUNICATION SYSTEM AND DEVICE SUPPORTING SAME

(71) Applicant: LG Electronics Inc., Seoul (KR)

(72) Inventors: Jeongsu Lee, Seoul (KR); Hyunsoo Ko, Seoul (KR); Sukhyon Yoon, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 461 days.

(21) Appl. No.: 17/440,046

(22) PCT Filed: Mar. 19, 2020

(86) PCT No.: PCT/KR2020/095042
§ 371 (c)(1),
(2) Date: Sep. 16, 2021

(87) PCT Pub. No.: WO2020/190117
PCT Pub. Date: Sep. 24, 2020

(65) Prior Publication Data
US 2022/0150982 A1 May 12, 2022

(30) Foreign Application Priority Data
Mar. 19, 2019 (KR) .......................... 10-2019-0031490

(51) Int. Cl.
*H04W 74/0833* (2024.01)
*H04W 72/0446* (2023.01)
(Continued)

(52) U.S. Cl.
CPC ... *H04W 74/0841* (2013.01); *H04W 72/0446* (2013.01); *H04W 72/0453* (2013.01); *H04W 74/004* (2013.01); *H04W 74/0866* (2013.01)

(58) Field of Classification Search
None
See application file for complete search history.

(56) References Cited

U.S. PATENT DOCUMENTS 11,588,669 B2 * 2/2023 Takeda .................. H04W 28/06
2010/0296467 A1 * 11/2010 Pelletier ................ H04L 5/0048
370/329

(Continued)

FOREIGN PATENT DOCUMENTS

CN 105282837 A * 1/2016 ............... H04L 1/18
CN 109417454 A * 3/2019 ........... H04L 1/1819

(Continued)

OTHER PUBLICATIONS

International Search Report and Written Opinion in International Appln. No. PCT/KR2020/095042, dated Jul. 6, 2020, 18 pages (with English translation).

(Continued)

*Primary Examiner* — Andrew C Oh
(74) *Attorney, Agent, or Firm* — Fish & Richardson P.C.

(57) ABSTRACT

The present disclosure relates to a method for transmitting and receiving a signal in a wireless communication system and a device supporting same. The method comprises the steps of: obtaining message A comprising a physical random access channel (PRACH) preamble and a physical uplink shared channel (PUSCH); and transmitting the message A. The PUSCH is transmitted in one or more PUSCH occasions among continuous PUSCH occasions within a frequency domain and a time domain. The PRACH preamble is obtained from one or more predetermined PRACH preambles. The indices of the one or more PRACH preamble are mapped to the one or more PUSCH occasions in the ascending order.

9 Claims, 38 Drawing Sheets

(51) Int. Cl.
    *H04W 72/0453*     (2023.01)
    *H04W 74/00*     (2009.01)
    *H04W 74/08*     (2009.01)

(56) References Cited

U.S. PATENT DOCUMENTS

| | | | | |
|---|---|---|---|---|
| 2013/0242874 | A1* | 9/2013 | Li | H04W 48/10 370/328 |
| 2014/0112259 | A1* | 4/2014 | Bagheri | H04W 72/51 370/329 |
| 2014/0369297 | A1* | 12/2014 | Bertrand | H04L 27/2692 370/329 |
| 2015/0011238 | A1* | 1/2015 | Tujkovic | H04W 4/029 455/456.1 |
| 2015/0085839 | A1* | 3/2015 | Bergstrom | H04W 56/0045 370/336 |
| 2017/0272214 | A1* | 9/2017 | Chen | H04L 5/0001 |
| 2018/0270869 | A1 | 9/2018 | Tsai | |
| 2019/0053211 | A1* | 2/2019 | Ying | H04W 72/044 |
| 2019/0141639 | A1* | 5/2019 | Rahman | H04W 52/22 |
| 2020/0205156 | A1* | 6/2020 | Adjakple | H04W 72/02 |
| 2021/0392701 | A1* | 12/2021 | Uemura | H04W 28/0278 |
| 2022/0039171 | A1* | 2/2022 | Ohara | H04W 72/04 |
| 2022/0095378 | A1* | 3/2022 | Lei | H04W 74/006 |
| 2022/0132580 | A1* | 4/2022 | Ohara | H04W 74/002 |
| 2022/0132595 | A1* | 4/2022 | Ko | H04W 74/0866 |
| 2022/0338264 | A1* | 10/2022 | Ko | H04W 74/006 |

FOREIGN PATENT DOCUMENTS

| | | | | |
|---|---|---|---|---|
| CN | 110366261 | A * | 10/2019 | H04W 72/042 |
| CN | 110475378 | A * | 11/2019 | H04L 5/0044 |
| CN | 111263452 | A * | 6/2020 | H04W 72/0413 |
| CN | 113170438 | A * | 7/2021 | H04L 1/0018 |
| CN | 113348701 | A * | 9/2021 | H04W 28/26 |
| CN | 113439467 | A * | 9/2021 | H04W 74/0833 |
| CN | 111586707 | B * | 5/2022 | H04L 1/1607 |
| CN | 111586881 | B * | 9/2022 | H04L 5/0053 |
| CN | 111565470 | B * | 3/2023 | H04W 52/36 |
| CN | 111294937 | B * | 4/2023 | H04W 72/042 |
| EP | 3927090 | A1 * | 12/2021 | H04W 72/04 |
| JP | 2010237184 | A * | 10/2010 | G01S 13/74 |
| JP | 2015516775 | A | 6/2015 | |
| KR | 20170063640 | A * | 6/2017 | H04W 74/08 |
| KR | 20210068085 | A * | 9/2018 | H04L 27/2602 |
| KR | 101940532 | | 1/2019 | |
| WO | WO-2019051373 | A1 * | 3/2019 | H04L 27/2605 |
| WO | WO-2019074311 | A1 * | 4/2019 | H04L 5/0055 |
| WO | WO-2020031357 | A1 * | 2/2020 | H04B 7/0456 |
| WO | WO-2020157994 | A1 * | 8/2020 | H04W 28/0278 |
| WO | WO-2020164141 | A1 * | 8/2020 | |
| WO | WO-2020164700 | A1 * | 8/2020 | |
| WO | WO-2020166044 | A1 * | 8/2020 | H04W 72/04 |
| WO | WO-2020166046 | A1 * | 8/2020 | H04W 74/002 |
| WO | WO-2020181431 | A1 * | 9/2020 | |
| WO | WO-2020188663 | A1 * | 9/2020 | |

OTHER PUBLICATIONS

NTT Docomo, Inc., "Discussion on Channel Structure for Two-Step RACH," R1-1902784, Presented at 3GPP TSG RAN WG1 #96, Athens, Greece, Feb. 25-Mar. 1, 2019, 3 pages.

Vivo, "Discussion on channel structure for 2-step RACH," R1-1901669, Presented at 3GPP TSG RAN WG1 #96, Athens, Greece, Feb. 25-Mar. 1, 2019, 5 pages.

ZTE & Sanechips, "Considerations on the channel structure of msgA," R1-1901626, Presented at 3GPP TSG RAN WG1 Meeting #96, Athens, Greece, Feb. 25-Mar. 1, 2019, 5 pages.

ZTE, "Summary of 7.2.1.1 Channel Structure for Two-step RACH," R1-1903435, Presented at 3GPP TSG RAN WG1 #96, Athens, Greece, Feb. 25-Mar. 1, 2019, 28 pages.

* cited by examiner (a)

(b)

METHOD FOR TRANSMITTING AND RECEIVING SIGNAL IN WIRELESS COMMUNICATION SYSTEM AND DEVICE SUPPORTING SAME

CROSS-REFERENCE TO RELATED APPLICATIONS

This application is a National Stage application under 35 U.S.C. § 371 of International Application No. PCT/KR2020/095042, filed on Mar. 19, 2020, which claims the benefit of Korean Application No. 10-2019-0031490, filed on Mar. 19, 2019. The disclosures of the prior applications are incorporated by reference in their entirety.

TECHNICAL FIELD

Embodiments of the present disclosure relate to a wireless communication system, and more particularly, to a method and apparatus for transmitting and receiving a signal in a wireless communication system.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

SUMMARY

Various embodiments of the present disclosure may provide a method and apparatus for transmitting and receiving a signal in a wireless communication system.

In addition, various embodiments of the present disclosure may provide a method for performing a 2-step RACH procedure in a wireless communication system, and a device for supporting the same.

Various embodiments of the present disclosure may provide a method for constructing an RACH occasion and a PUSCH occasion in a message "A" for a 2-step RACH procedure in a wireless communication system, and a device for supporting the same.

Various embodiments of the present disclosure may provide a method for multiplexing PUSCHs included in the message "A" supporting the 2-step RACH procedure, and a device for supporting the same.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Various embodiments of the present disclosure may provide a method and apparatus for transmitting and receiving a signal in a wireless communication system.

Various embodiments of the present disclosure a method performed by a user equipment in a wireless communication system may be provided.

In exemplary embodiments, the method may include obtaining a message-A including a physical random access channel (PRACH) preamble and a physical uplink shared channel (PUSCH); and transmitting the message-A.

In exemplary embodiments, the PUSCH may be transmitted in at least one PUSCH occasion from among PUSCH occasions that are consecutive in a frequency domain and a time domain.

In exemplary embodiments, the PRACH preamble may be obtained from among at least one preconfigured PRACH preamble.

In exemplary embodiments, at least one index of the at least one PRACH preamble may be mapped to the at least one PUSCH occasion in ascending order.

In exemplary embodiments, the at least one index of the at least one PRACH preamble may be mapped to the at least one PUSCH occasion in ascending order based on at least one of: (i) the PUSCH occasions being frequency-multiplexed in the frequency domain being considered in ascending order, or (ii) the PUSCH occasions being time-multiplexed in the time domain being considered in ascending order.

In exemplary embodiments, (i) after the PUSCH occasions frequency-multiplexed in the frequency domain may be considered in ascending order, (ii) the PUSCH occasions time-multiplexed in the time domain may be considered in ascending order.

In exemplary embodiments, the PRACH preambles may be transmitted in at least one PRACH occasion from among PRACH occasions.

In exemplary embodiments, at least one of a time offset or a frequency offset may be configured between the PRACH occasions and the PUSCH occasions In exemplary embodiments, the method may further include determining a start location of the PUSCH occasions based on at least one of the time offset or the frequency offset.

In exemplary embodiments, the time offset may be configured as at least one slot.

In exemplary embodiments, the frequency offset may be configured as at least one resource block (RB).

According to various embodiments of the present disclosure, an apparatus in a wireless communication system may be provided.

In exemplary embodiments, the apparatus may include a memory, and at least one processor coupled with the memory.

In exemplary embodiments, the at least one processor may be configured to obtain a message-A including a physical random access channel (PRACH) preamble and a physical uplink shared channel (PUSCH), and transmitting the message-A.

In exemplary embodiments, the PUSCH may be transmitted in at least one PUSCH occasion from among PUSCH occasions that are consecutive in a frequency domain and a time domain.

In exemplary embodiments, the PRACH preamble may be obtained from among at least one preconfigured PRACH preamble.

In exemplary embodiments, at least one index of the at least one PRACH preamble may be mapped to the at least one PUSCH occasion in ascending order.

In exemplary embodiments, the at least one index of the at least one PRACH preamble may be mapped to the at least one PUSCH occasion in ascending order based on at least one of: (i) the PUSCH occasions being frequency-multiplexed in the frequency domain being considered in ascending order, or (ii) the PUSCH occasions being time-multiplexed in the time domain being considered in ascending order.

In exemplary embodiments, (i) after the PUSCH occasions frequency-multiplexed in the frequency domain are considered in ascending order, (ii) the PUSCH occasions time-multiplexed in the time domain are considered in ascending order.

In exemplary embodiments, the PRACH preambles may be transmitted in at least one PRACH occasion from among PRACH occasions.

In exemplary embodiments, at least one of a time offset and a frequency offset may be configured between the PRACH occasions and the PUSCH occasions.

In exemplary embodiments, the at least one processor may be further configured to determine start locations of the PUSCH occasions based on at least one of the time offset or the frequency offset.

In exemplary embodiments, the apparatus may be configured to communicate with at least one of a mobile terminal, a network, and an autonomous vehicle other than a vehicle comprising the apparatus.

According to various embodiments of the present disclosure, a method performed by a base station (BS) in a wireless communication system may be provided.

In exemplary embodiments, the method may include receiving a message-A, and obtaining a physical random access channel (PRACH) preamble and a physical uplink shared channel (PUSCH) based on the message-A.

In exemplary embodiments, the PUSCH may be received in at least one PUSCH occasion from among PUSCH occasions that are consecutive in a frequency domain and a time domain.

In exemplary embodiments, the PRACH preamble may be obtained from among at least one preconfigured PRACH preamble.

In exemplary embodiments, at least one index of the at least one PRACH preamble may be mapped to the at least one PUSCH occasion in ascending order.

According to various embodiments of the present disclosure, an apparatus in a wireless communication system may be provided.

In exemplary embodiments, the apparatus may include a memory and at least one processor coupled with the memory.

In exemplary embodiments, the at least one processor may be configured to receive a message-A, and obtain a physical random access channel (PRACH) preamble and a physical uplink shared channel (PUSCH) based on the message-A.

In exemplary embodiments, the PUSCH may be received in at least one PUSCH occasion from among PUSCH occasions that are consecutive in a frequency domain and a time domain.

The PRACH preamble may be obtained from among at least one preconfigured PRACH preamble.

In exemplary embodiments, at least one index of the at least one PRACH preamble may be mapped to the at least one PUSCH occasion in ascending order.

According to various embodiments of the present disclosure, an apparatus in a wireless communication system may be provided.

In exemplary embodiments, the apparatus may include at least one processor; and at least one memory storing at least one instruction causing the at least one processor to perform a method.

In exemplary embodiments, the method may include obtaining a message-A including a physical random access channel (PRACH) preamble and a physical uplink shared channel (PUSCH), and transmitting the message-A.

In exemplary embodiments, the PUSCH may be transmitted in at least one PUSCH occasion from among PUSCH occasions that are consecutive in a frequency domain and a time domain.

In exemplary embodiments, the PRACH preamble may be obtained from among at least one preconfigured PRACH preamble.

In exemplary embodiments, at least one index of the at least one PRACH preamble may be mapped to the at least one PUSCH occasion in ascending order.

According to various embodiments of the present disclosure, a processor-readable medium storing at least one instruction causing at least one processor to perform a method may be provided.

In exemplary embodiments, the method may include obtaining a message-A including a physical random access channel (PRACH) preamble and a physical uplink shared channel (PUSCH), and transmitting the message-A.

In exemplary embodiments, the PUSCH may be transmitted in at least one PUSCH occasion from among PUSCH occasions that are consecutive in a frequency domain and a time domain.

In exemplary embodiments, the PRACH preamble may be obtained from among at least one preconfigured PRACH preamble.

In exemplary embodiments, at least one index of the at least one PRACH preamble is mapped to the at least one PUSCH occasion in ascending order.

The above-described aspects of the present disclosure are only some of the preferred embodiments of the present disclosure, and various embodiments reflecting the technical features of the present disclosure may be derived and understood from the following detailed description of the present disclosure by those skilled in the art.

The various embodiments of the present disclosure have the following effects.

Various embodiments of the present disclosure may provide a method and apparatus for transmitting and receiving a signal in a wireless communication system.

Various embodiments of the present disclosure may provide a method for performing a 2-step RACH procedure in a wireless communication system, and a device for supporting the same.

Various embodiments of the present disclosure may provide a method for constructing an RACH occasion and a PUSCH occasion in the message "A" for a 2-step RACH procedure in a wireless communication system, and a device for supporting the same.

Various embodiments of the present disclosure may provide a method for multiplexing PUSCHs included in the message "A" supporting the 2-step RACH procedure, and a device for supporting the same.

It will be appreciated by persons skilled in the art that that the effects that can be achieved through the various embodiments of the present disclosure are not limited to those described above and other advantageous effects of the various embodiments of the present disclosure will be more clearly understood from the following detailed description. That is, unintended effects according to implementation of the present disclosure may be derived by those skilled in the art from the various embodiments of the present disclosure.

BRIEF DESCRIPTION OF THE DRAWINGS

The accompanying drawings, which are included to provide a further understanding of the various embodiments of the present disclosure, provide the various embodiments of the present disclosure together with detail explanation. Yet, a technical characteristic the various embodiments of the present disclosure is not limited to a specific drawing. Characteristics disclosed in each of the drawings are combined with each other to configure a new embodiment. Reference numerals in each drawing correspond to structural elements.

DETAILED DESCRIPTION

Figure 1:
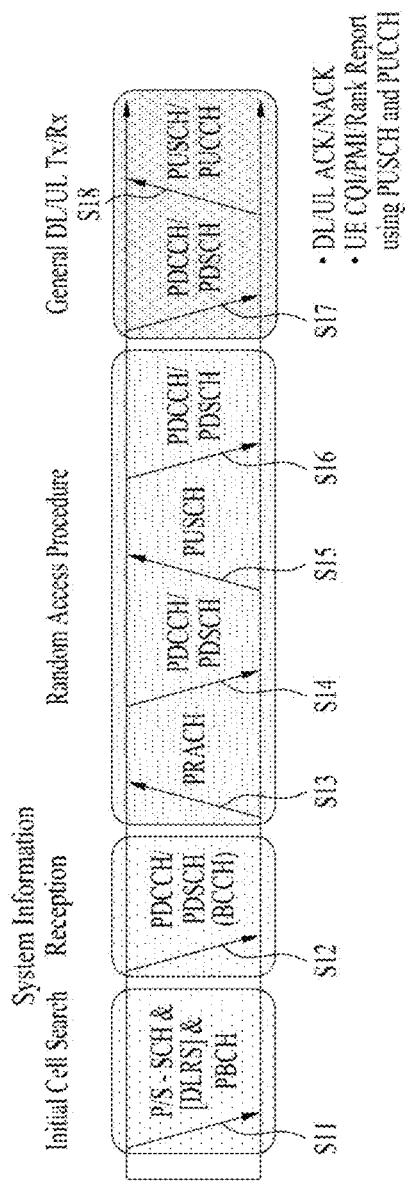
FIG. 1 is a diagram illustrating physical channels and a signal transmission method using the physical channels, which may be used in various embodiments of the present disclosure.

The various embodiments of the present disclosure described below are combinations of elements and features of the various embodiments of the present disclosure in specific forms. The elements or features may be considered selective unless otherwise mentioned. Each element or feature may be practiced without being combined with other elements or features. Further, various embodiments of the present disclosure may be constructed by combining parts of the elements and/or features. Operation orders described in various embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the various embodiments of the present disclosure will be avoided lest it should obscure the subject matter of the various embodiments of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the various embodiments of the present disclosure (more particularly, in the context of the following claims) unless indicated otherwise in the specification or unless context clearly indicates otherwise.

In the various embodiments of the present disclosure, a description is mainly made of a data transmission and reception relationship between a base station (BS) and a user equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the various embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

Various embodiments of the present disclosure may be supported by standard specifications disclosed for at least one of wireless access systems including an institute of electrical and electronics engineers (IEEE) 802.xx system, a 3rd generation partnership project (3GPP) system, a 3GPP long term evolution (LTE) system, a 3GPP 5th generation (5G) new RAT (NR) system, and a 3GPP2 system. In particular, the various embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 37.213, 3GPP TS 38.211, 3GPP TS 38.212, 3GPP TS 38.213, 3GPP TS 38.214, 3GPP TS 38.321, and 3GPP TS 38.331. That is, the steps or parts which are not described in the various embodiments of the present disclosure may be described with reference to the above standard specifications. Further, all terms used herein may be described by the standard specifications.

Reference will now be made in detail to the various embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the various embodiments of the present disclosure. However, it will be apparent to those skilled in the art that the specific terms may be replaced with other terms without departing the technical spirit and scope of the various embodiments of the present disclosure.

Hereinafter, 3GPP LTE/LTE-A systems and 3GPP NR system are explained, which are examples of wireless access systems.

The various embodiments of the present disclosure can be applied to various wireless access systems such as code division multiple access (CDMA), frequency division multiple access (FDMA), time division multiple access (TDMA), orthogonal frequency division multiple access (OFDMA), Single carrier frequency division multiple access (SC-FDMA), and so on.

CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved UTRA (E-UTRA), etc.

UTRA is a part of Universal Mobile Telecommunications System (UMTS). 3GPP LTE is a part of evolved UMTS (E-UMTS) using E-UTRA, adopting OFDMA for DL and SC-FDMA for UL. LTE-advanced (LTE-A) is an evolution of 3GPP LTE.

While the various embodiments of the present disclosure are described in the context of 3GPP LTE/LTE-A systems and 3GPP NR system in order to clarify the technical features of the various embodiments of the present disclosure, the various embodiments of the present disclosure is also applicable to an IEEE 802.16e/m system, etc.

1. Overview of 3GPP System

1.1. Physical Channels and General Signal Transmission

In a wireless access system, a UE receives information from a BS on a DL and transmits information to the BS on a UL. The information transmitted and received between the UE and the BS includes general data information and various types of control information. There are many physical channels according to the types/usages of information transmitted and received between the BS and the UE.

FIG. 1 is a diagram illustrating physical channels and a signal transmission method using the physical channels, which may be used in various embodiments of the present disclosure.

When a UE is powered on or enters a new cell, the UE performs initial cell search (S11). The initial cell search involves acquisition of synchronization to a BS. Specifically, the UE synchronizes its timing to the BS and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the BS.

During the initial cell search, the UE may monitor a DL channel state by receiving a downlink reference signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the BS, the UE may perform a random access procedure with the BS (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps, steps S13 and S15 may be performed in one operation for a UE transmission, and steps S14 and S16 may be performed in one operation for a BS transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called UCI. The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
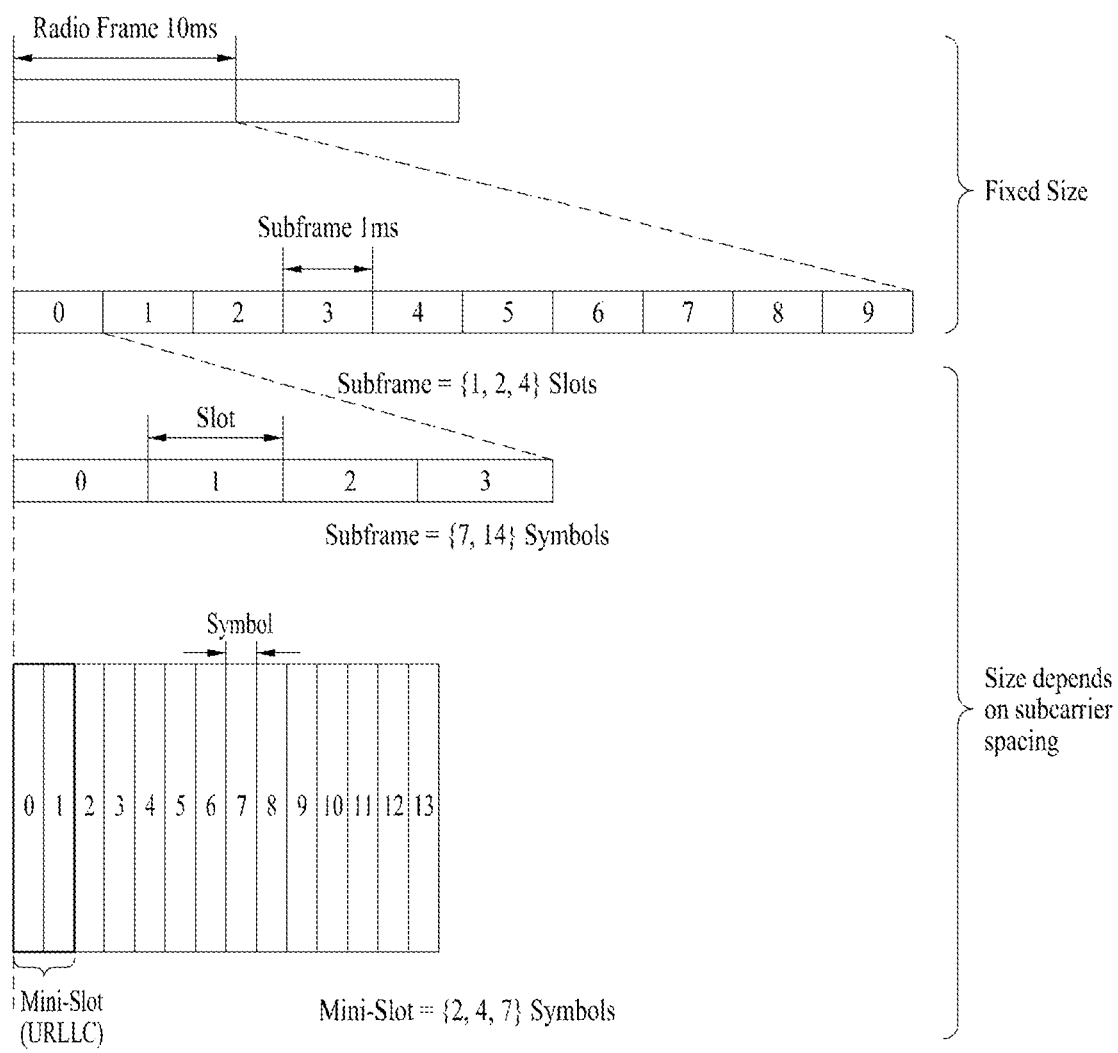
FIG. 2 is a diagram illustrating a radio frame structure in a new radio access technology (NR) system to which various embodiments of the present disclosure are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or $\mu$). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part (BWP), $\mu$ and a CP are obtained from RRC parameters provided by the BS.

TABLE 1

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $Tc=1/(\Delta fmax*Nf)$ where $\Delta fmax=480*10^3$ Hz and a value Nf related to a fast Fourier transform (FFT) size or an inverse fast Fourier transform (IFFT) size is given as Nf=4096. Tc and Ts which is an LTE-based time unit and sampling time, given as $Ts=1/((15 kHz)*2048)$ are placed in the following relationship: Ts/Tc=64. DL and UL transmissions are organized into (radio) frames each having a duration of $Tf=(\Delta fmax*Nf/100)*Tc=10$ ms. Each radio frame includes 10 subframes each having a duration of $Tsf=(\Delta fmax*Nf/1000)*Tc=1$ ms. There may exist one set of frames for UL and one set of frames for DL. For a numerology p, slots are numbered with nμs∈{0, . . . , Nslot, μsubframe-1} in an increasing order in a subframe, and with nμs,f∈{0, . . . , Nslot, μframe-1} in an increasing order in a radio frame. One slot includes Nμsymb consecutive OFDM symbols, and Nμsymb depends on a CP. The start of a slot nμs in a subframe is aligned in time with the start of an OFDM symbol nμs*Nμsymb in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 6, one subframe may include four slots. One subframe={1, 2, 4} slots in FIG. 7, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
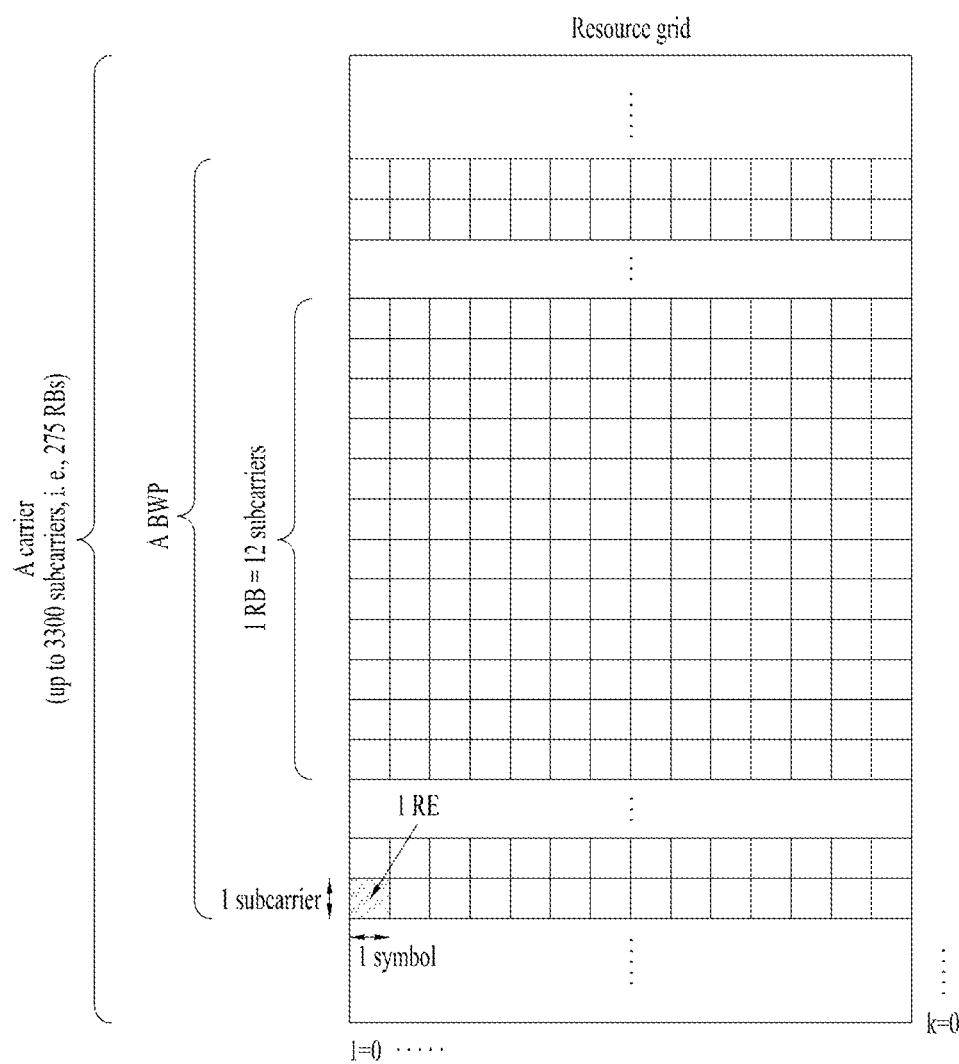
FIG. 3 is a diagram illustrating a slot structure in an NR system to which various embodiments of the present disclosure are applicable.

FIG. 3 is a diagram illustrating a slot structure in an NR system to which various embodiments of the present disclosure are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A BWP, which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
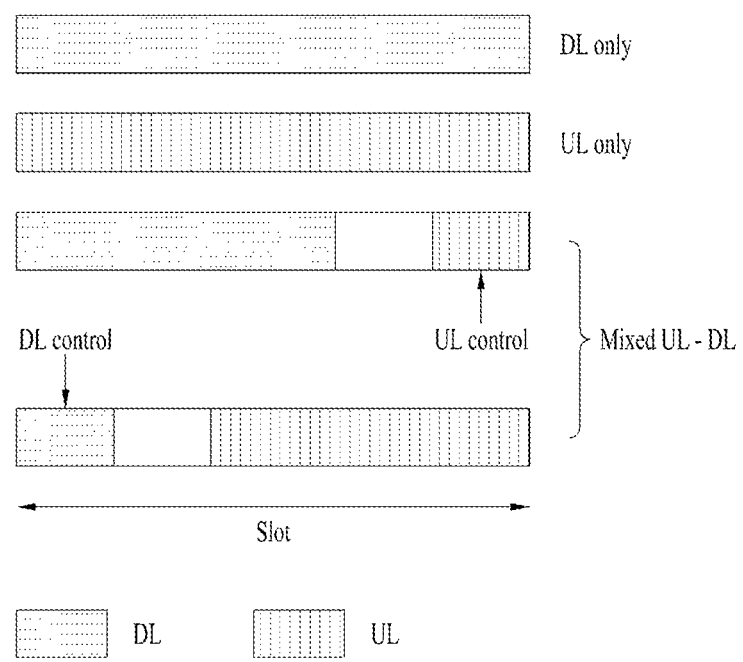
FIG. 4 is a diagram illustrating a self-contained slot structure to which various embodiments of the present disclosure are applicable.

FIG. 4 is a diagram illustrating a self-contained slot structure to which various embodiments of the present disclosure are applicable.

The self-contained slot structure may refer to a slot structure in which all of a DL control channel, DL/UL data, and a UL control channel may be included in one slot.

In FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a BS and a UE may sequentially perform DL transmission and UL transmission in one slot. That is, the BS and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the BS and the UE to switch from transmission mode to reception mode and vice versa. To this end, in the self-contained slot structure, some OFDM symbols at the time of switching from DL to UL may be configured as a guard period (GP).

While the self-contained slot structure has been described above as including both of a DL control region and a UL control region, the control regions may selectively be included in the self-contained slot structure. In other words, the self-contained slot structure according to various embodiments of the present disclosure may cover a case of including only the DL control region or the UL control region as well as a case of including both of the DL control region and the UL control region, as illustrated in FIG. 4.

Further, the sequence of the regions included in one slot may vary according to embodiments. For example, one slot may include the DL control region, the DL data region, the UL control region, and the UL data region in this order, or the UL control region, the UL data region, the DL control region, and the DL data region in this order.

A PDCCH may be transmitted in the DL control region, and a PDSCH may be transmitted in the DL data region. A PUCCH may be transmitted in the UL control region, and a PUSCH may be transmitted in the UL data region.

1.3. Channel Structures 1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an ACK/NACK information for DL data, channel state information (CSI), a scheduling request (SR), and so on.

The PDCCH carries DCI and is modulated in QPSK. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

Figure 5:
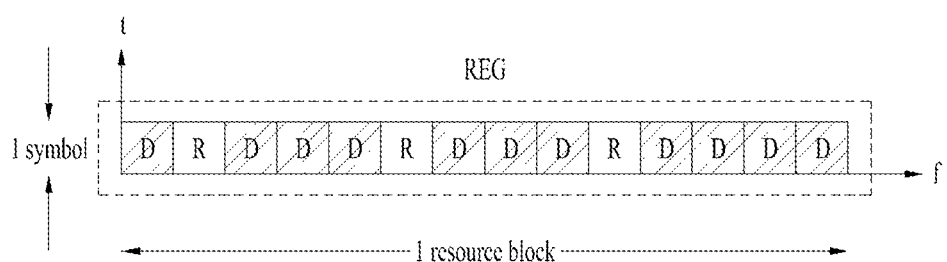
FIG. 5 is a diagram illustrating the structure of one resource element group (REG) in an NR system to which various embodiments of the present disclosure are applicable.

FIG. 5 is a diagram illustrating the structure of one REG to which various embodiments of the present disclosure are applicable.

In FIG. 5, D represents an RE to which DCI is mapped, and R represents an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

For each CORESET, a precoder granularity in the frequency domain is set to one of the followings by higher-layer signaling:
   sameAsREG-bundle: It equals to an REG bundle size in the frequency domain.
   allContiguousRBs: It equals to the number of contiguous RBs in the frequency domain within the CORESET.

The REGs of the CORESET are numbered in a time-first mapping manner. That is, the REGs are sequentially numbered in an increasing order, starting with 0 for the first OFDM symbol of the lowest-numbered RB in the CORESET.

CCE-to-REG mapping for the CORESET may be an interleaved type or a non-interleaved type.

Figure 6:
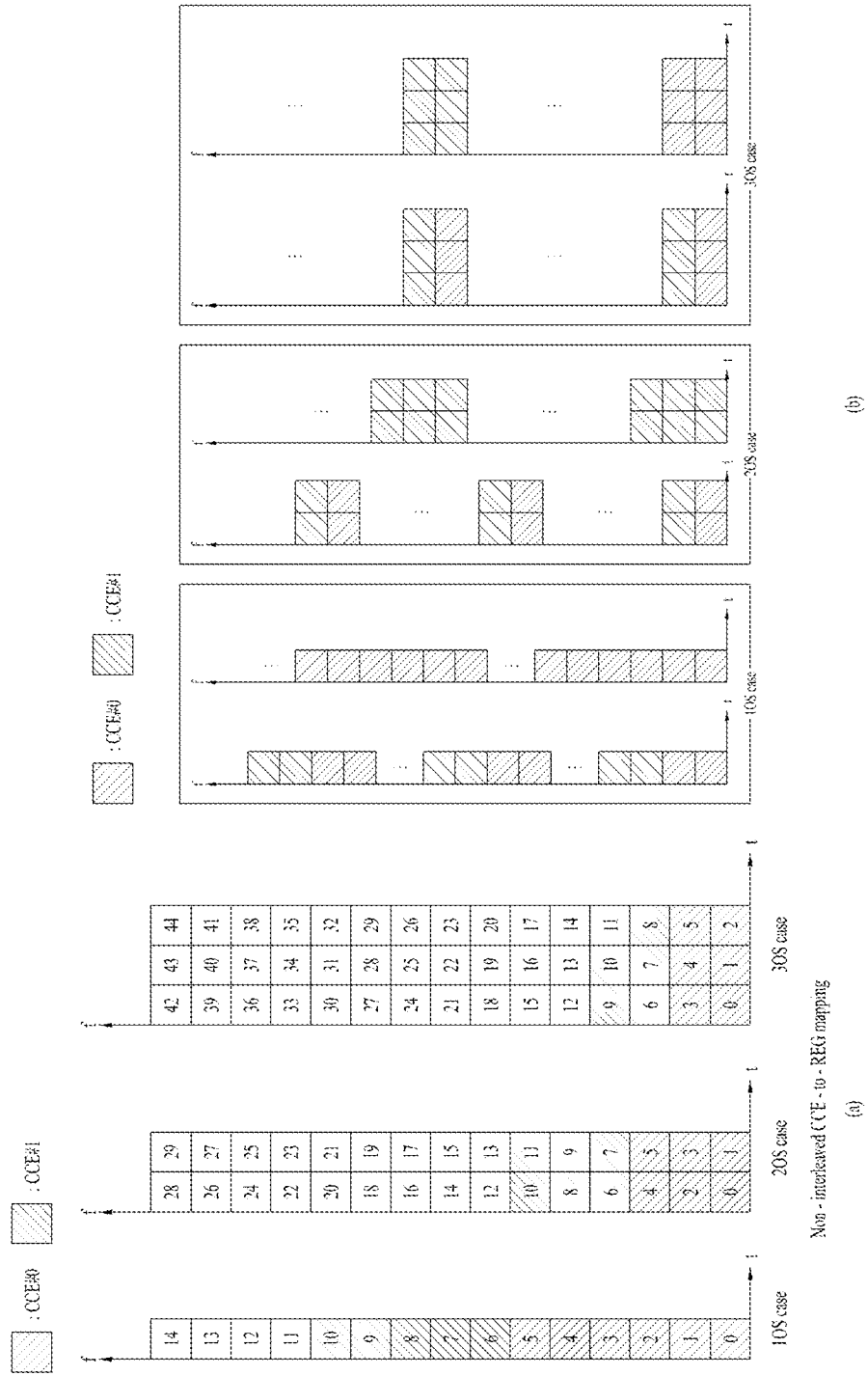
FIG. 6 is a diagram illustrating exemplary control channel element (CCE)-to-resource element group (REG) mapping types according to various embodiments of the present disclosure.

FIG. 6 is a diagram illustrating exemplary CCE-to-REG mapping types according to various embodiments of the present disclosure.

FIG. 6(a) is a diagram illustrating exemplary non-interleaved CCE-to-REG mapping according to various embodiments of the present disclosure.
   Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

FIG. 6(b) is a diagram illustrating exemplary interleaved CCE-to-REG mapping.
   Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 7:
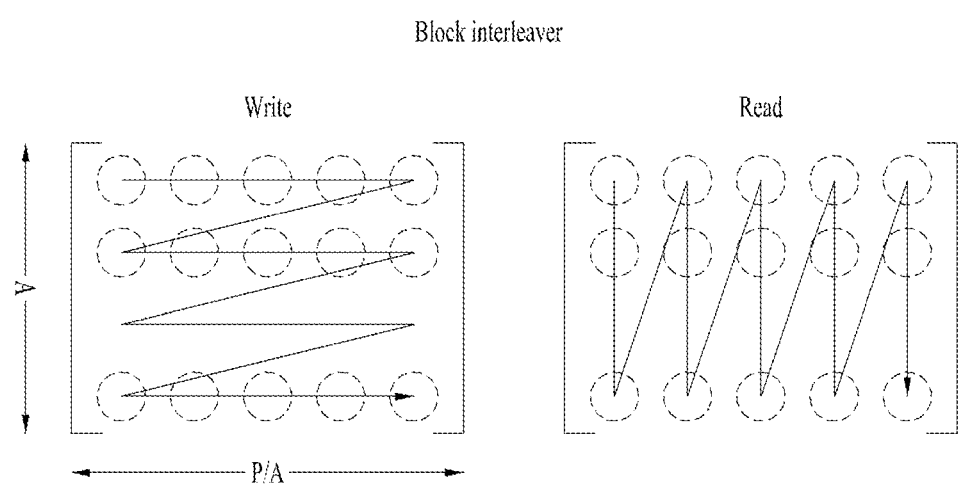
FIG. 7 is a diagram illustrating an exemplary block interleaver according to various embodiments of the present disclosure.

FIG. 7 illustrates an exemplary block interleaver according to various embodiments of the present disclosure.

For the above interleaving operation, the number A of rows in a (block) interleaver is set to one of 2, 3, and 6. If the number of interleaving units for a given CORESET is P, the number of columns in the block interleaver is P/A. In the block interleaver, a write operation is performed in a row-first direction, and a read operation is performed in a column-first direction, as illustrated in FIG. C4. Cyclic shift (CS) of an interleaving unit is applied based on an ID which is configurable independently of a configurable ID for the DMRS.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.
   controlResourceSetId: A set of control resources related to the search space set.
   monitoringSlotPeriodicityAndOffset: A PDCCH monitoring periodicity (in slots) and a PDCCH monitoring offset (in slots).
   monitoringSymbolsWithinSlot: A PDCCH monitoring pattern (e.g., the first symbol(s) in the CORESET) in a PDCCH monitoring slot.
   nrofCandidates: The number of PDCCH candidates for each AL={1, 2, 4, 8, 16} (one of 0, 1, 2, 3, 4, 5, 6, and 8).

Table 5 lists exemplary features of the respective search space types.

TABLE 5

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI (s) | |
| | UE Specific | C-RNTI, or MCS-C-RNTI, or CS-RNTI(s) | User specific PDSCH decoding |

Table 6 lists exemplary DCI formats transmitted on the PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCE in one cell |
| 1_1 | Scheduling of PDSCH in one cell |
| 2_0 | Notifying a group of UEs of the slot format |

TABLE 6-continued

| DCI format | Usage |
|---|---|
| 2_1 | Notifying a group of UEs of the PRB(s) and OFDM symbol (s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to the UE, and DCI format 2_1 is used to deliver DL preemption information to the UE. DCI format 2_0 and/or DCI format 2_1 may be delivered to the UEs of a group on a group common PDCCH (GC-PDCCH) which is a PDCCH directed to a group of UEs.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

TABLE 7

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.4. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 8:
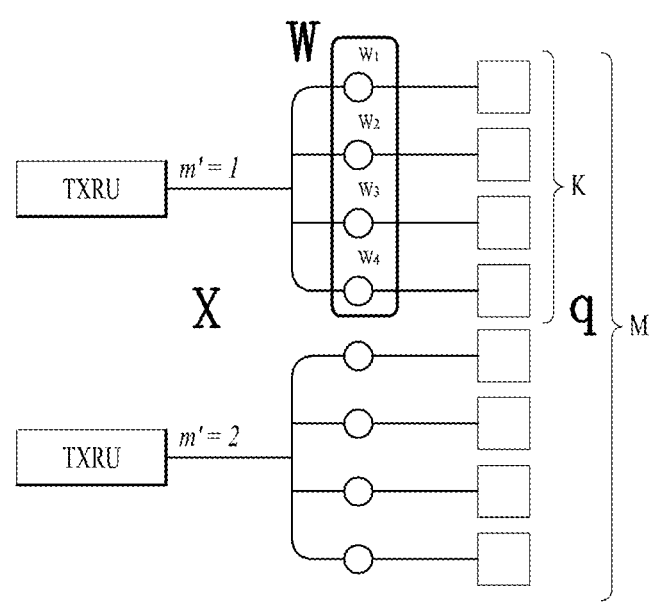
FIG. 8 is a diagram illustrating a representative method of connecting transceiver units (TXRUs) to antenna elements according to various embodiments of the present disclosure.
Figure 9:
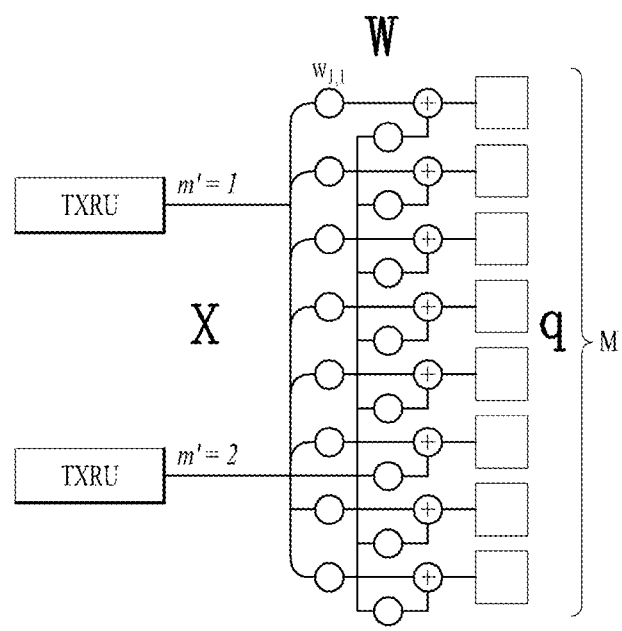
FIG. 9 is a diagram illustrating a representative method of connecting TXRUs to antenna elements according to various embodiments of the present disclosure.

FIGS. 8 and 9 are diagrams illustrating representative methods for connecting TXRUs to antenna elements. Here, the TXRU virtualization model represents the relationship between TXRU output signals and antenna element output signals.

FIG. 8 shows a method for connecting TXRUs to subarrays. In FIG. 8, one antenna element is connected to one TXRU.

Meanwhile, FIG. 9 shows a method for connecting all TXRUs to all antenna elements. In FIG. 9, all antenna elements are connected to all TXRUs. In this case, separate addition units are required to connect all antenna elements to all TXRUs as shown in FIG. 9.

In FIGS. 8 and 9, W indicates a phase vector weighted by an analog phase shifter. That is, W is a major parameter determining the direction of the analog beamforming. In this case, the mapping relationship between channel state information-reference signal (CSI-RS) antenna ports and TXRUs may be 1:1 or 1-to-many.

The configuration shown in FIG. 8 has a disadvantage in that it is difficult to achieve beamforming focusing but has an advantage in that all antennas can be configured at low cost.

On the contrary, the configuration shown in FIG. 9 is advantageous in that beamforming focusing can be easily achieved. However, since all antenna elements are connected to the TXRU, it has a disadvantage of high cost.

When a plurality of antennas is used in the NR system to which the present disclosure is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N TXRUs and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 10:
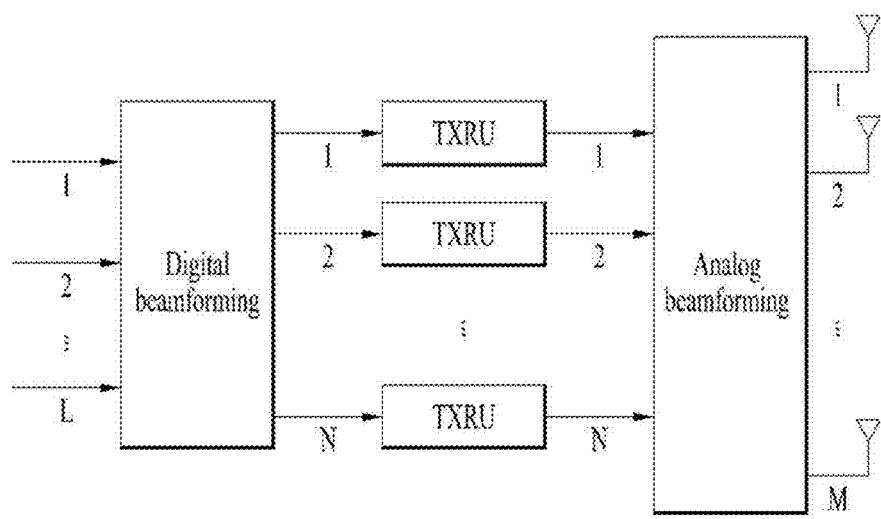
FIG. 10 is a simplified diagram illustrating a hybrid beamforming structure from the perspective of TXRUs and physical antennas according to various embodiments of the present disclosure.

FIG. 10 is a diagram schematically illustrating an exemplary hybrid BF structure from the perspective of TXRUs and physical antennas according to the present disclosure. In FIG. 10, the number of digital beams is L and the number analog beams is N.

Additionally, in the NR system to which the present disclosure is applicable, an BS designs analog BF to be changed in units of symbols to provide more efficient BF support to a UE located in a specific area. Furthermore, as illustrated in FIG. 7, when N specific TXRUs and M RF antennas are defined as one antenna panel, the NR system according to the present disclosure considers introducing a plurality of antenna panels to which independent hybrid BF is applicable.

In the case in which the BS utilizes a plurality of analog beams as described above, the analog beams advantageous for signal reception may differ according to a UE. Therefore, in the NR system to which the present disclosure is applicable, a beaming operation is being considered in which the BS transmits signals (at least synchronization signals, system information, paging, and the like) by applying different analog beams in a specific subframe or slot on a symbol-by-symbol basis so that all UEs may have reception opportunities.

Figure 11:
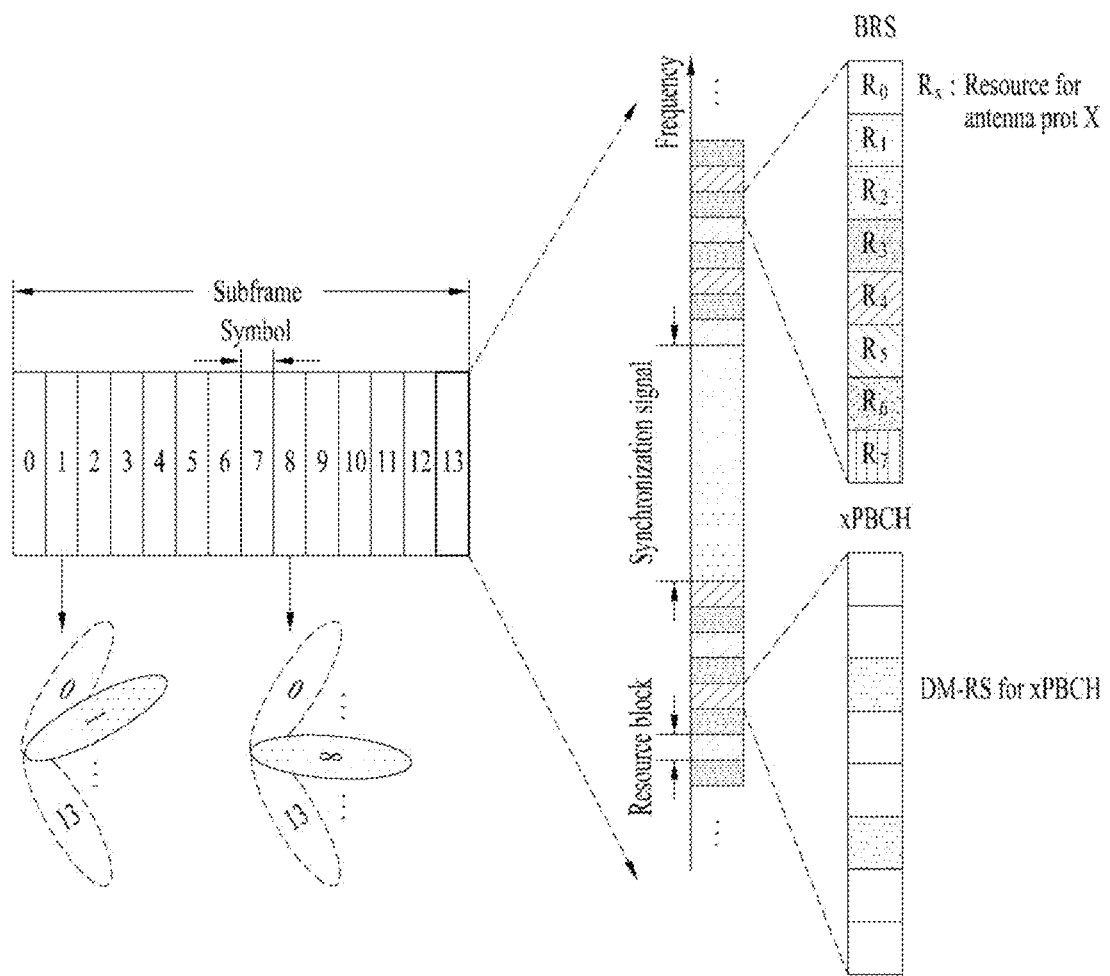
FIG. 11 is a simplified diagram illustrating a beaming operation for a synchronization signal and system information in a downlink (DL) transmission procedure according to various embodiments of the present disclosure.

FIG. 11 is a simplified diagram illustrating a beaming operation for a synchronization signal and system information in a DL transmission procedure according to various embodiments of the present disclosure.

In FIG. 11, a physical resource (or physical channel) in which the system information of the NR system to which various embodiments of the present disclosure are applicable is transmitted in a broadcasting manner is referred to as an xPBCH. Analog beams belonging to different antenna panels may be transmitted simultaneously in one symbol.

As illustrated in FIG. 11, in order to measure a channel for each analog beam in the NR system to which various embodiments of the present disclosure are applicable, a beam RS (BRS), which is a reference signal (RS) transmitted by applying a single analog beam (corresponding to a specific antenna panel), may be introduced. The BRS may be defined for a plurality of antenna ports, and each antenna port of the BRS may correspond to a single analog beam. Unlike the BRS, a synchronization signal or the xPBCH may be transmitted by applying all analog beams of an analog beam group such that any UE may receive the signal successfully.

1.5. Cell Search

Figure 12:
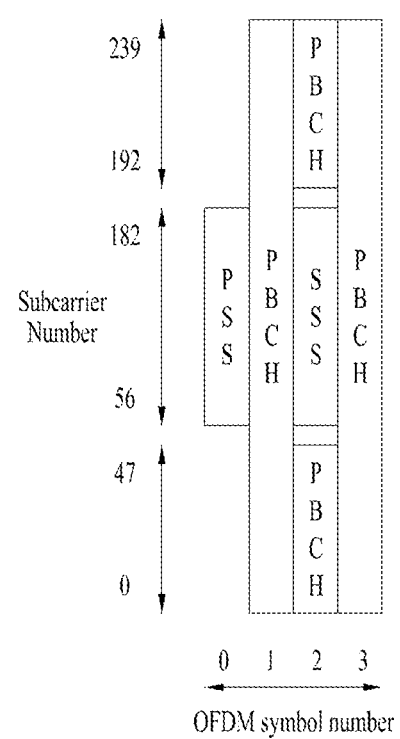
FIG. 12 is a diagram illustrating the structure of a synchronization signal block (SSB) to which various embodiments of the present disclosure are applicable.

FIG. 12 is a diagram illustrating the structure of a synchronization signal block (SSB) to which various embodiments of the present disclosure are applicable.

A UE may perform cell search, system information acquisition, beam alignment for initial access, DL measurement, and so on based on an SSB. The term SSB is interchangeably used with synchronization signal/physical broadcast channel (SS/PBCH) block.

Referring to FIG. 12, the SSB to which various embodiments of the present disclosure are applicable may include 20 RBs in four consecutive OFDM symbols. Further, the SSB may include a PSS, an SSS, and a PBCH, and the UE may perform cell search, system information acquisition, beam alignment for initial access, DL measurement, and so on based on the SSB.

Each of the PSS and the SSS includes one OFDM symbol by 127 subcarriers, and the PBCH includes three OFDM symbols by 576 subcarriers. Polar coding and QPSK are applied to the PBCH. The PBCH includes data REs and DMRS REs in every OFDM symbol. There are three DMRS REs per RB, with three data REs between every two adjacent DMRS REs.

Further, the SSB may be transmitted in a frequency band other than the center of the frequency band used by the network.

For this purpose, a synchronization raster being candidate frequency positions at which the UE should detect the SSB is defined in the NR system to which various embodiments of the present disclosure are applicable. The synchronization raster may be distinguished from a channel raster.

In the absence of explicit signaling of the position of the SSB, the synchronization raster may indicate available frequency positions for the SSB, at which the UE may acquire system information.

The synchronization raster may be determined based on a global synchronization channel number (GSCN). The GSCN may be transmitted by RRC signaling (e.g., an MIB, a system information block (SIB), remaining minimum system information (RMSI), other system information (OSI), or the like).

The synchronization raster is defined to be longer along the frequency axis than the channel raster and characterized by a smaller number of blind detections than the channel raster, in consideration of the complexity of initial synchronization and a detection speed.

Cell search refers to a procedure in which the UE acquires time/frequency synchronization of a cell and detects a cell ID (e.g., physical layer cell ID (PCID)) of the cell. The PSS may be used to detect a cell ID within a cell ID group, and the SSS may be used to detect the cell ID group. The PBCH may be used in detecting an SSB (time) index and a half-frame.

The cell search procedure of the UE may be summarized as described in Table 8 below.

TABLE 8

| | Type of Signals | Operations |
|---|---|---|
| $1^{st}$ step | PSS | * SS/PBCH block (SSB) symbol timing acquisition<br>* Cell ID detection within a cell ID group (3 hypothesis) |
| $2^{nd}$ Step | SSS | * Cell ID group detection (336 hypothesis) |
| $3^{rd}$ Step | PBCH DRS | * SSB index and Half frame (HF) index (Slot and frame boundary detection) |
| $4^{th}$ Step | PBCH | * Time information (80 ms, System Frame Number (SFN), SSB index, HF)<br>* Remaining Minimum System Information (RMSI) Control resource set (CORESET)/Search space configuration |
| $5^{th}$ Step | PDCCH and PDSCH | * Cell access information<br>* RACH configuration |

There are 336 cell ID groups each including three cell IDs. There are 1008 cell IDs in total. Information about a cell ID group to which the cell ID of a cell belongs may be provided/obtained through the SSS of the cell, and information about the cell ID among 336 cells in the cell ID may be provided/obtained through the PSS.

Figure 13:
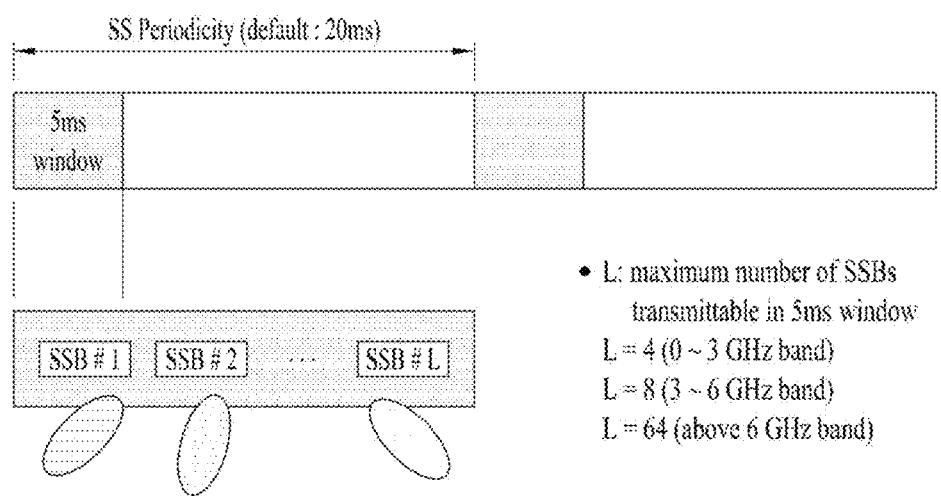
FIG. 13 is a diagram illustrating an exemplary SSB transmission method to which various embodiments of the present disclosure are applicable.

FIG. 13 is a diagram illustrating an exemplary SSB transmission method to which various embodiments of the present disclosure are applicable.

Referring to FIG. 13, the SSB is periodically transmitted according to an SSB periodicity. A default SSB periodicity assumed by the UE during initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set is configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to an SCS as follows. The time positions of SSB candidates are indexed as (SSB indexes) 0 to L-1 in time order within the SSB burst set (i.e., half-frame).

Case A: 15-kHz SCS: The indexes of the first symbols of candidate SSBs are given as $\{2, 8\}+14*n$ where n=0, 1 for a carrier frequency equal to or lower than 3 GHz, and n=0, 1, 2, 3 for a carrier frequency of 3 GHz to 6 GHz.

Case B: 30-kHz SCS: The indexes of the first symbols of candidate SSBs are given as $\{4, 8, 16, 20\}+28*n$ where n=0 for a carrier frequency equal to or lower than 3 GHz, and n=0, 1 for a carrier frequency of 3 GHz to 6 GHz.

Case C: 30-kHz SCS: The indexes of the first symbols of candidate SSBs are given as $\{2, 8\}+14*n$ where n=0, 1 for a carrier frequency equal to or lower than 3 GHz, and n=0, 1, 2, 3 for a carrier frequency of 3 GHz to 6 GHz.

Case D: 120-kHz SCS: The indexes of the first symbols of candidate SSBs are given as $\{4, 8, 16, 20\}+28*n$ where n=0, 1, 2, 3, 5, 6, 7, 8, 10, 11, 12, 13, 15, 16, 17, 18 for a carrier frequency above 6 GHz.

Case E: 240-kHz SCS: The indexes of the first symbols of candidate SSBs are given as $\{8, 12, 16, 20, 32, 36, 40, 44\}+56*n$ where n=0, 1, 2, 3, 5, 6, 7, 8 for a carrier frequency above 6 GHz.

1.6. Synchronization Procedure

The UE may acquire synchronization by receiving the above-described SSB from the BS. The synchronization procedure largely includes cell ID detection and timing detection. The cell ID detection may include PSS-based cell ID detection and SSS-based cell ID detection. The timing detection may include PBCH DMRS-based timing detection and PBCH content-based (e.g., MIB-based) timing detection.

First, the UE may acquire timing synchronization and the physical cell ID of a detected cell by detecting a PSS and an SSS. More specifically, the UE may acquire the symbol timing of the SS block and detect a cell ID within a cell ID group, by PSS detection. Subsequently, the UE detects the cell ID group by SSS detection.

Further, the UE may detect the time index (e.g., slot boundary) of the SS block by the DMRS of the PBCH. The UE may then acquire half-frame boundary information and system frame number (SFN) information from an MIB included in the PBCH.

The PBCH may indicate that a related (or corresponding) RMSI PDCCH/PDSCH is transmitted in the same band as or a different band from that of the SS/PBCH block. Accordingly, the UE may then receive RMSI (e.g., system information other than the MIB) in a frequency band indicated by the PBCH or a frequency band carrying the PBCH, after decoding the PBCH.

In relation to the operation, the UE may acquire system information.

The MIB includes information/parameters required for monitoring a PDCCH that schedules a PDSCH carrying SystemInformationBlock1 (SIB1), and is transmitted to the UE on the PBCH in the SS/PBCH block by the BS.

The UE may check whether there is a CORESET for a Type0-PDCCH common search space, based on the MIB. The Type0-PDCCH common search space is a kind of PDCCH search space and used to transmit a PDCCH that schedules a system information (SI) message.

In the presence of a Type0-PDCCH common search space, the UE may determine (i) a plurality of contiguous RBs included in the CORESET and one or more consecutive symbols and (ii) a PDCCH occasion (e.g., a time-domain position for PDCCH reception), based on information (e.g., pdcch-ConfigSIB1) included in the MIB.

In the absence of a Type0-PDCCH common search space, pdcch-ConfigSIB1 provides information about a frequency position at which the SSB/SIB1 exists and a frequency range in which the SSB/SIB1 does not exist.

SIB1 includes information about the availability and scheduling of the other SIBs (hereinafter, referred to as SIBx where x is an integer equal to or larger than 2). For example, SIB1 may indicate whether SIBx is periodically broadcast or provided in an on-demand manner (or upon request of the UE). When SIBx is provided in the on-demand manner, SIB1 may include information required for an SI request of the UE. SIB1 is transmitted on a PDSCH. A PDCCH that schedules SIB1 is transmitted in a Type0-PDCCH common search space, and SIB1 is transmitted on a PDSCH indicated by the PDCCH.

1.7. Quasi Co-Located or Quasi Co-Location (QCL)

The UE may receive a list of up to M candidate transmission configuration indication (TCI)-State configurations to decode a PDSCH according to a detected PDCCH carrying DCI intended for the UE and a given cell. M depends on a UE capability.

Each TCI-State includes a parameter for establishing a QCL relationship between one or two DL RSs and a PDSCH DMRS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info, and may have one of the following values.

'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

For example, when a target antenna port is for a specific non-zero power (NZP) CSI-RS, corresponding NZP CSI-RS antenna ports may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply a reception (Rx) beam used to receive a QCL-Type D SSB for reception of the NZP CSI-RS.

1.8. RRC State

Figure 14:
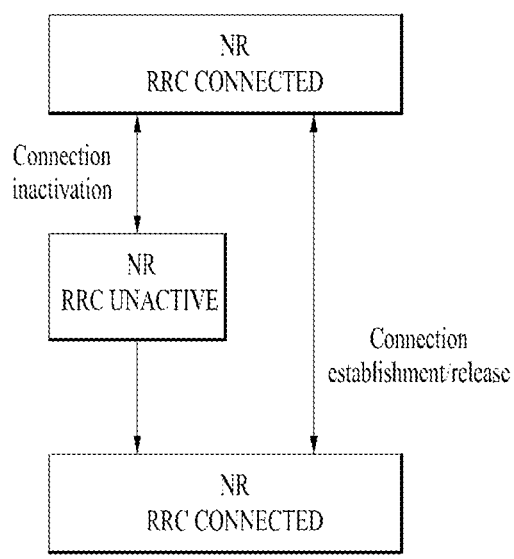
FIG. 14 is a flowchart illustrating RRC states of the UE and an RRC state transition of the UE to which various embodiments can be applied.

FIG. 14 is a flowchart illustrating RRC states of the UE and an RRC state transition of the UE according to various embodiments of the present disclosure. For example, the UE may have only one RRC state at a specific time point.

Figure 15:
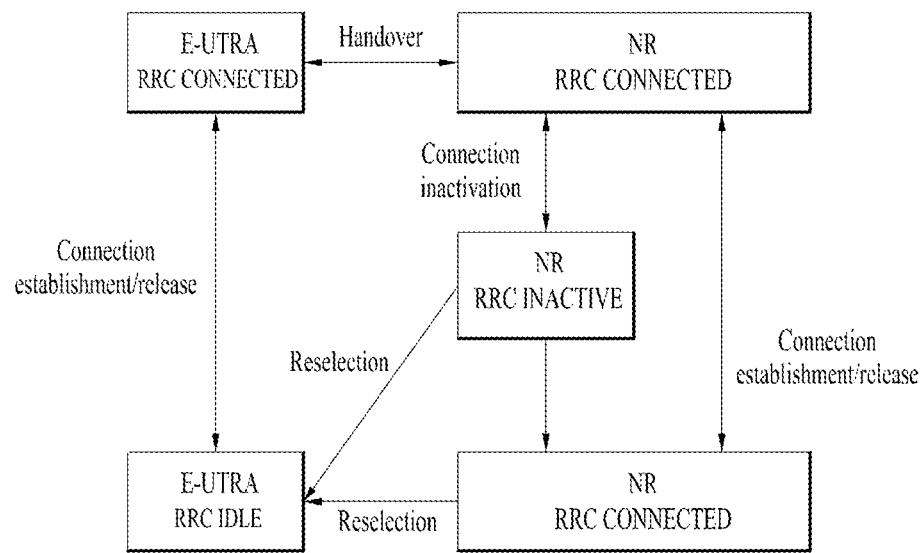
FIG. 15 is a flowchart illustrating RRC states of the UE, RRC state transition of the UE, and a mobility procedure supported between NR/NGC and E-UTRAN/EPC according to various embodiments of the present disclosure.
Figure 16:
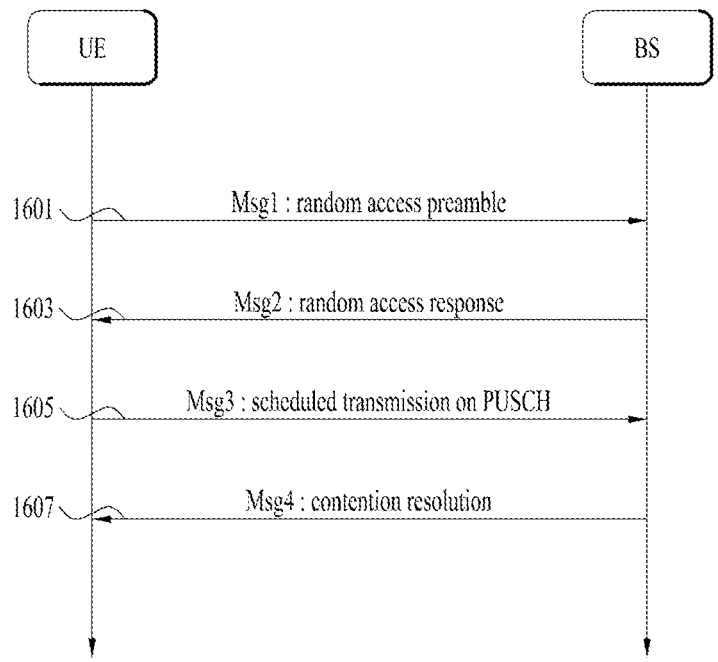
FIG. 16 is a diagram illustrating an exemplary 4-step random access channel (RACH) procedure to which various embodiments of the present disclosure are applicable.
Figure 16:
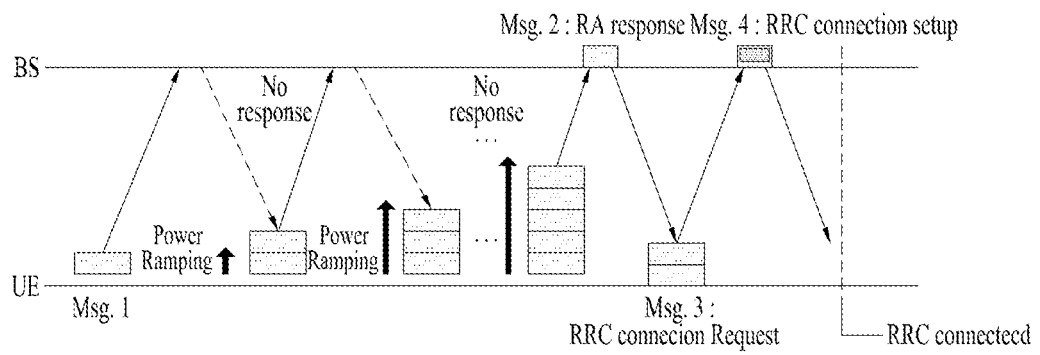

FIG. 15 is a flowchart illustrating RRC states of the UE, RRC state transition of the UE, and a mobility procedure supported between NR/NGC (NR/Next Generation Core) and E-UTRAN/EPC (Evolved-Universal Terrestrial Radio Access Network/Evolved Packet Core) according to various embodiments of the present disclosure.

The RRC state indicates whether an RRC layer of the UE is logically connected to an RRC layer of the NG RAN. When an RRC connection is established, the UE is in RRC_CONNECTED state or RRC_INACTIVE state. Otherwise, that is, if no RRC connection is established, the UE is in RRC_IDLE state.

When the UE is in RRC_CONNECTED state or RRC_INACTIVE state, the UE has an RRC connection, so that the NG RAN may recognize the presence of the UE in a cell unit. In contrast, when the UE is in RRC_IDLE state, the UE may not be recognized by the NG RAN and is managed by a core network in a tracking area unit, which is a unit of a larger area than a cell.

When an initial user first turns on the UE, the UE first searches for an appropriate cell and then maintains RRC_IDLE state in the cell. Only when it is necessary to establish an RRC connection, the UE in RRC_IDLE state may establish an RRC connection with the NG RAN through an RRC connection procedure and then transition to RRC_CONNECTED state or RRC_INACTIVE state.

RRC states of the UE have the following characteristics.

(1) RRC_IDLE state
UE-specific discontinuous reception (DRX) may be configured by a higher layer.
UE mobility is controlled based on network configuration.
UE monitors a paging channel;
UE performs adjacent cell measurement and cell (reselection).
UE acquires system information (SI).

(2) RRC_INACTIVE state
UE-specific DRX may be configured by the higher layer or RRC layer.
UE mobility is controlled based on network configuration.
The UE stores an access stratum (AS) context.
UE monitors the paging channel.
UE performs adjacent cell measurement and cell (reselection).
UE performs RAN-based notification area update when the UE moves out of a RAN-based notification area.
UE acquires system information (SI).

(3) RRC_CONNECTED state
The UE stores an AS context.
UE transmits and receives unicast data.
In a lower layer, the UE may be configured with UE-specific DRX.
For the UE supporting CA (Carrier Aggregation), one or more SCells aggregated with an SpCell (Special Cell) are used for extended bandwidth.
For the UE supporting DC (Dual Connectivity), one SCG (Secondary Cell Group) aggregated with an MCG (Master Cell Group) is used for extended bandwidth.
UE monitors a paging channel.
When data is scheduled for UE, UE monitors control channels associated with a shared data channel.
UE provides channel quality and feedback information.
UE performs adjacent cell measurement and cell (re) selection.
UE acquires SI.

Specifically, the UE in RRC_IDLE state and the UE in RRC_INACTIVE state may operate as shown in the following Table 9.

TABLE 9

| | UE procedure |
|---|---|
| $1^{st}$ step | a public land mobile network (PLMN) selection when a UE is switched on |
| $2^{nd}$ Step | cell (re)selection for searching a suitable cell |
| $3^{rd}$ Step | tune to its control channel (camping on the cell) |
| $4^{th}$ Step | Location registration and a RAN-based Notification Area (RNA) update |

2. Random Access (RACH) Procedure

When a UE initially accesses a BS or has no radio resources for a signal transmission, the UE may perform a random access procedure with the BS.

The random access procedure is used for various purposes. For example, the random access procedure may be used for initial network access in an RRC_IDLE state, an RRC connection reestablishment procedure, handover, UE-triggered UL data transmission, transition in an RRC_INACTIVE state, time alignment establishment in SCell addition, OSI request, and beam failure recovery. The UE may acquire UL synchronization and UL transmission resources in the random access procedure.

Random access procedures may be classified into a contention-based random access procedure and a contention-free random access procedure. The contention-based random access procedure is further branched into a 4-step random access (4-step RACH) procedure and a 2-step random access (2-step RACH) procedure.

2.1. 4-Step RACH: Type-1 Random Access Procedure

Figure 17:
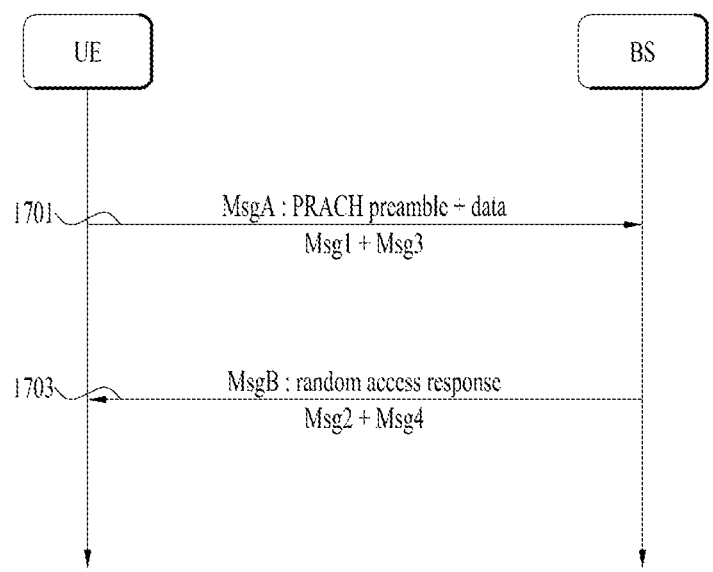
FIG. 17 is a diagram illustrating an exemplary 2-step RACH procedure to which various embodiments of the present disclosure are applicable.

FIG. 17 is a diagram illustrating an exemplary 4-step RACH procedure to which various embodiments of the present disclosure are applicable.

When the (contention-based) random access procedure is performed in four steps (4-step RACH procedure), the UE may transmit a message (Message 1 (Msg1)) including a preamble related to a specific sequence on a PRACH (1601) and receive a PDCCH and a response message (RAR message) (Message 2 (Msg2)) for the preamble on a PDSCH corresponding to the PDCCH (1603). The UE transmits a message (Message 3 (Msg3)) including a PUSCH based on scheduling information included in the RAR (1605) and perform a contention resolution procedure involving reception of a PDCCH signal and a PDSCH signal corresponding to the PDCCH signal. The UE may receive a message (Message 4 (Msg4)) including contention resolution information for the contention resolution procedure from the BS (1607).

The 4-step RACH procedure of the UE may be summarized in Table 10 below.

TABLE 10

| | Type of Signals | Operations/Information obtained |
|---|---|---|
| 1st step | PRACH preamble in UL | * Initial beam obtainment<br>* Random selection of RA-preamble ID |
| 2nd step | Random Access Response on DL-SCH | * Timing Advanced information<br>* RA-preamble ID<br>* Initial UL grant, Temporary C-RNTI |
| 3rd step | UL transmission on UL-SCH | * RRC connection request<br>* UE identifier |
| 4th step | Contention Resolution on DL | * Temporary C-RNTI on PDCCH for initial access<br>* C-RNTI on PDC for UE in RRC_CONNECTED |

In the random access procedure, the UE may first transmit an RACH preamble as Msg1 on a PRACH.

Random access preamble sequences of two different lengths are supported. The longer sequence length 839 is applied to the SCSs of 1.25 kHz and 5 kHz, whereas the shorter sequence length 139 is applied to the SCSs of 15 kHz, 30 kHz, 60 kHz, and 120 kHz.

Multiple preamble formats may be defined by one or more RACH OFDM symbols and different cyclic prefixes (CPs) (and/or guard time). RACH configuration for the initial bandwidth of a primary cell (PCell) may be included in system information (SI) of the cell and provided to the UE. The RACH configuration may include a subcarrier spacing of PRACH, available preambles, a preamble format, etc. The RACH configuration may include association information between SSBs and RACH resources (time-frequency resources). The UE may transmit a random access preamble in RACH time-frequency resources related to detected or selected SSBs.

A threshold value of the SSB for RACH resource association may be configured by the network, and transmission or retransmission of the RACH preamble may be performed based on the SSB in which RSRP (Reference Signal Received Power) measured based on SSB satisfies the threshold value. For example, the UE may select one of SSBs satisfying the threshold value, and may transmit or retransmit the RACH preamble based on the RACH resources associated with the selected SSB. For example, upon retransmission of the RACH preamble, the UE may reselect one of the SSB(s) and retransmit the RACH preamble based on the RACH resources related to the reselected SSB. That is, RACH resources for RACH preamble retransmission may be identical to or different from the RACH resources for RACH preamble transmission.

When the BS receives a random access preamble from the UE, the BS may transmit a random access response (RAR) message (Msg2) to the UE. PDCCH for scheduling a PDSCH carrying the RAR is CRC-scrambled with a radio network temporary identifier (RNTI) (RA-RNTI), and is then transmitted. The UE having detected the PDCCH that is CRC-scrambled with RA-RNTI may receive the RAR from the PDSCH scheduled by DCI carried by the PDCCH. The UE may determine whether random access response (RAR) information for Msg1 (i.e., UE-transmitted preamble) exists in the RAR. The presence or absence of random access information for Msg1 transmitted by UE may be determined based on information about the presence or absence of the RAR ID for the UE-transmitted preamble. If a response for Msg1 does not exist, the UE may retransmit the RACH preamble a predetermined number of times or less while performing power ramping. The UE may calculate PRACH transmission (Tx) power for preamble retransmission by referring to the latest transmission power, the power increment, and the power ramping counter.

The RAR information may include a preamble sequence transmitted by the UE, a temporary cell-RNTI (TC-RNTI) allocated from the BS to the UE having attempted to perform random access, uplink transmit (Tx) time alignment information, uplink transmit (Tx) power adjustment information, and radio resource allocation information. When RAR information related to the UE is received by the UE over a PDSCH, the UE may recognize timing advance information for UL synchronization, initial UL grant, and TC-RNTI. The timing advance information may be used to control the UL signal transmit (Tx) timing point. To allow PUSCH/PUCCH transmission by the UE to be well aligned with the subframe timing point at the network stage, the network (e.g., BS) may acquire timing advance information based on timing information detected from the PRACH preamble received from the UE, and may send the corresponding timing advance information. The UE may perform UL transmission as Msg3 of the random access procedure (RAR) on a UL shared channel based on the RAR information. Msg3 may include an RRC connection request and a UE identifier. As a response to Msg3, the network may transmit Msg4, and this can be treated as a contention resolution message on downlink (DL). Upon receiving Msg4, the UE may enter the RRC connected state.

As described before, the UL grant included in the RAR schedules a PUSCH transmission to the BS. A PUSCH carrying an initial UL transmission based on the UL grant of the RAR is referred to as an Msg3 PUSCH. The content of the RAR UL grant starts from the most significant bit (MSB) and ends in the least significant bit (LSB), given as Table 11.

TABLE 11

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |

TABLE 11-continued

| RAR UL grant field | Number of bits |
| --- | --- |
| Transmit power control (TPC) for Msg3 PUSCH | 3 |
| CSI request | 1 |

A transmit power control (TPC) command is used to determine the transmission power of the Msg3 PUSCH. For example, the TPC command is interpreted according to Table 12.

TABLE 12

| TPC command | value [dB] |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

2.2. 2-Step RACH: Type-2 Random Access Procedure

FIG. 17 is a diagram illustrating an exemplary 2-step RACH procedure to which various embodiments of the present disclosure are applicable.

The (contention-based) RACH procedure performed in two steps, that is, the 2-step RACH procedure has been proposed to simplify the RACH procedure and thus achieve low signaling overhead and low latency.

In the 2-step RACH procedure, the operation of transmitting Msg1 and the operation of transmitting Msg3 in the 4-step RACH procedure may be incorporated into an operation of transmitting one message, Message A (MsgA) including a PRACH and a PUSCH by the UE. The operation of transmitting Msg2 by the BS and the operation of transmitting Msg4 by the BS in the 4-step RACH procedure may be incorporated into an operation of transmitting one message, Message B (MsgB) including an RAR and contention resolution information.

That is, in the 2-step RACH procedure, the UE may combine Msg1 and Msg3 of the 4-step RACH procedure into one message (e.g., MsgA) and transmit the message to the BS (1701).

Further, in the 2-step RACH procedure, the BS may combine Msg2 and Msg4 of the 4-step RACH procedure into one message (e.g., MsgB) and transmit the message to the UE (1703).

The 2-step RACH procedure may become a low-latency RACH procedure based on the combinations of these messages.

More specifically, MsgA may carry a PRACH preamble included in Msg1 and data included in Msg3 in the 2-step RACH procedure. In the 2-step RACH procedure, MsgB may carry an RAR included in Msg2 and contention resolution information included in Msg4.

2.3. Contention-Free RACH

Figure 18:
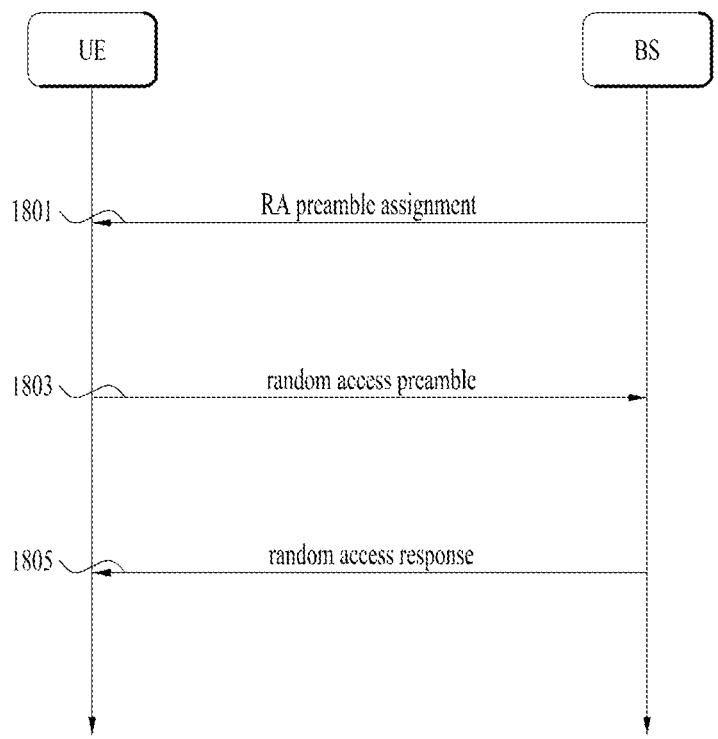
FIG. 18 is a diagram illustrating a contention-free RACH procedure to which various embodiments of the present disclosure are applicable.

FIG. 18 is a diagram illustrating an exemplary contention-free RACH procedure to which various embodiments of the present disclosure are applicable.

The contention-free RACH procedure may be used for handover of the UE to another cell or BS or may be performed when requested by a BS command. The contention-free RACH procedure is basically similar to the contention-based RACH procedure. However, compared to the contention-based RACH procedure in which a preamble to be used is randomly selected from among a plurality of RACH preambles, a preamble to be used by the UE (referred to as a dedicated RACH preamble) is assigned to the UE by the BS in the contention-free RACH procedure (1801). Information about the dedicated RACH preamble may be included in an RRC message (e.g., a handover command) or provided to the UE by a PDCCH order. When the RACH procedure starts, the UE transmits the dedicated RACH preamble to the BS (1803). When the UE receives an RAR from the BS, the RACH procedure is completed (1805).

In the contention-free RACH procedure, a CSI request field in an RAR UL grant indicates whether the UE is to include an aperiodic CSI report in a corresponding PUSCH transmission. An SCS for the Msg3 PUSCH transmission is provided by an RRC parameter. The UE may transmit the PRACH and the Msg3 PUSCH in the same UL carrier of the same serving cell. A UL BWP for the Msg3 PUSCH transmission is indicated by SIB 1.

2.4. Mapping Between SSB Blocks and PRACH Resource (Occasion)

Figure 19:
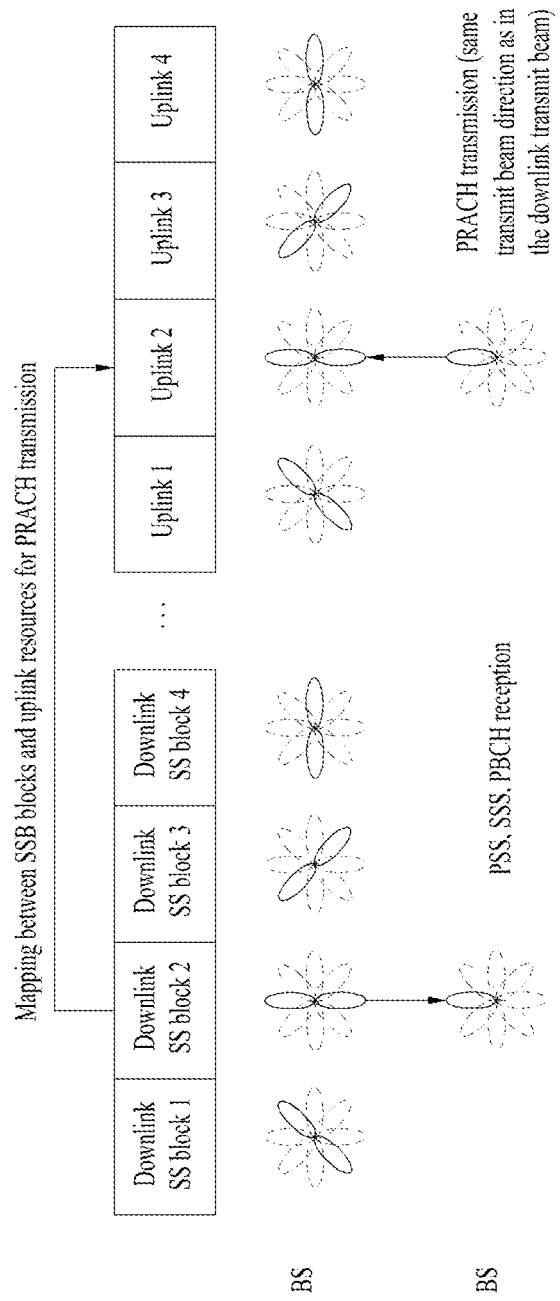
FIG. 19 is a diagram illustrating transmission of SS blocks and PRACH resources linked to the SS blocks according to various embodiments of the present disclosure.
Figure 20:
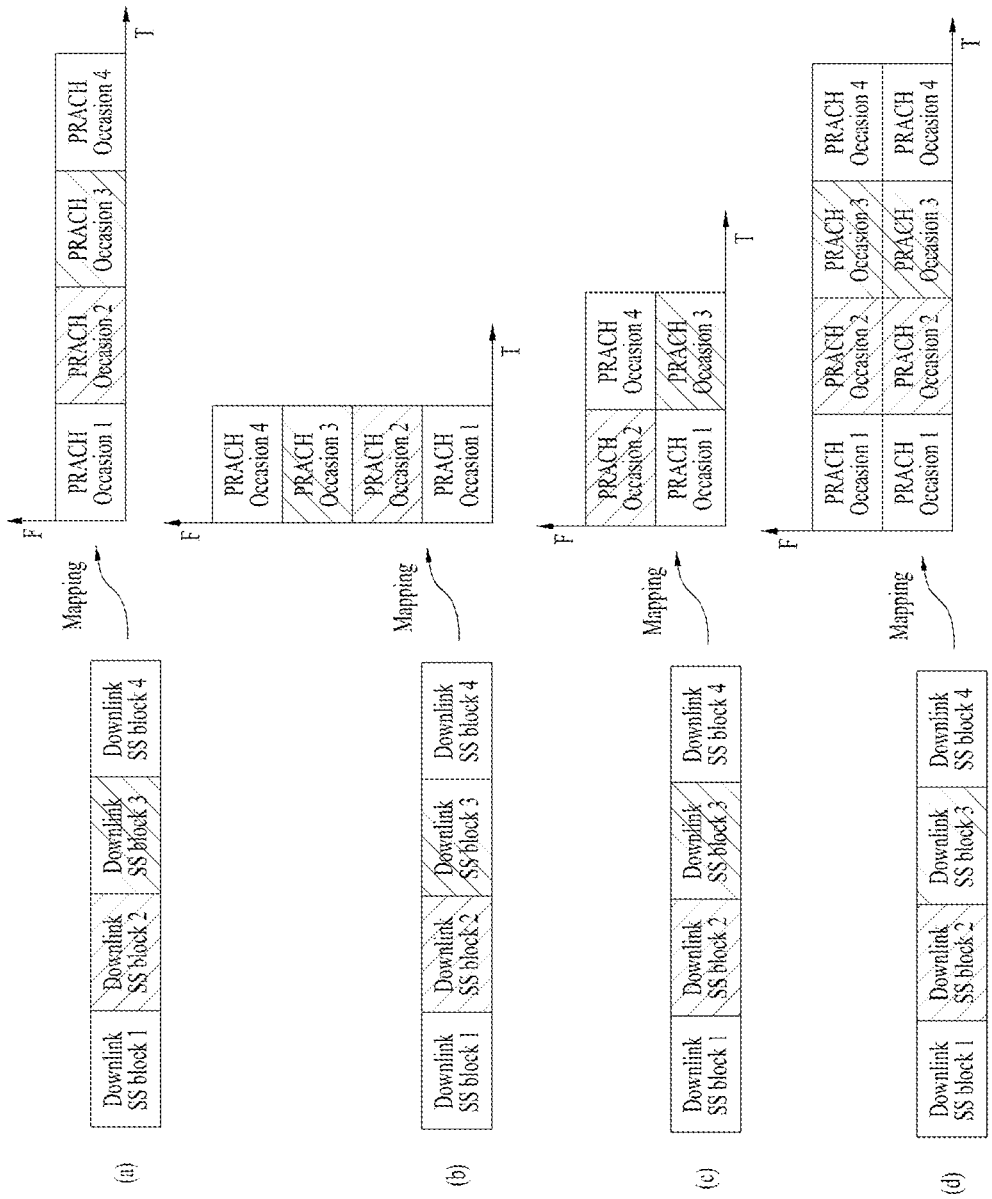
FIG. 20 is a diagram illustrating transmission of SS blocks and PRACH resources linked to the SS blocks according to various embodiments of the present disclosure.

FIGS. 19 and 20 illustrate examples of transmission of SS blocks and PRACH resources linked to the SS blocks according to various embodiments of the present disclosure.

In order for the BS to communicate with one UE, an optimum beam direction between the BS and the UE should be recognized. The optimum beam direction will be changed with movement of the UE, so that the UE should continuously track the optimum beam direction. A process for searching for the optimum beam direction between the BS and the UE is referred to as a beam acquisition process, and a process for continuously tracking the optimum beam direction is referred to as a beam tracking process. The beam acquisition process is required for an initial access state (1) in which the UE attempts to initially access the BS, a handover state (2) in which the UE is handed over from one BS to another BS, and a beam recovery state (3) for recovering a beam failure, etc. In the beam recovery state (3), 1 during the beam tracking for searching for an optimum beam between the UE and the BS, the optimum beam is lost so that it is impossible to maintain an optimum communication state between the BS and the UE or the UE is unable to communicate with the BS.

In the NR system, a multistage beam acquisition process is being discussed to perform beam acquisition in the environment in which multiple beams are used. In the multistage beam acquisition process, the BS and the UE perform a connection setup using a wide beam in the initial access stage. After completion of the connection setup, the BS and the UE may communicate with each other using a narrow beam with the optimal quality. In the NR system applicable to various embodiments of the present disclosure, one example of the beam acquisition process may be as follows.

1) The BS may transmit a synchronization block for each wide beam, so that the UE can find (or search for) the BS in the initial access step, can perform cell search or cell acquisition, can measure a channel quality for each beam of wide beams, and can thus find an optimum wide beam to be used in a first stage of such beam acquisition.

2) The UE may perform cell search for the synchronization block for each beam, and may acquire a downlink (DL) beam using the per-beam detection result.

3) The UE may perform the RACH process so that the BS found by the UE can recognize occurrence of the access behavior of the UE attempting to access the BS.

4) In order for the UE to inform the BS of the result of DL beam acquisition (e.g., a beam index) at a wide beam level while performing the RACH process, the BS may connect the synchronization block transmitted for each beam to PRACH resources to be used for PRACH transmission or may perform association between the synchronization block and the PRACH resources. When the UE performs the RACH process using the PRACH resources connected to the UE-found optimum beam, the BS may acquire information about the DL beam suitable for the UE in the PRACH preamble reception process.

In the multi-beam environment, information about whether the UE and/or TRP can correctly determine the direction of a transmit (Tx) beam and/or a reception (Rx) beam between the UE and the TRP (Transmission and Reception Point) may be considered to be the important issues. In the multi-beam environment, beam sweeping for repeating signal transmission or for receiving signals may be used according to Tx/Rx reciprocal capability of the TRP (e.g., BS) or the UE. TX/RX reciprocal capability may also be referred to as Tx/Rx beam correspondence at the TRP and UE. In the multi-beam environment, TX/RX reciprocal capability is not valid (i.e., a hold state) in the TRP and the UE, the UE may not transmit the UL signal in the beam direction along which the UE receives the DL signal. This is because the UL optimum path may be different from the DL optimum path. Tx/Rx beam correspondence at the TRP may be considered valid (i.e., a hold state) in a situation where the TRP can determine the TRP RX beam for receiving the corresponding UL signal based on UE DL measurement related to one or more TX beams of the TRP and/or in a situation where the TRP can determine the TRP TX beam for the corresponding DL transmission based on TRP UL measurement related to one or more RX beams of the TRP. Tx/Rx beam correspondence at the UE may be considered valid (i.e., a hold state) in a situation where the UE can determine the UE RX beam for transmitting the corresponding UL signal based on UE DL measurement related to one or more Rx beams of the UE and/or in a situation where the UE can determine the UE TX beam for receiving the corresponding DL signal based on a TRP indication message regarding UL measurement of one or more TX beams of the UE.

In the NR system, the RACH signal for initial access to the BS (i.e., the RACH signal for initial access to the BS through the cell used by the BS) can be configured using the following elements.

Cyclic Prefix (CP): The CP may prevent interference received from a previous/front OFDM symbol, and may group PRACH preamble signals that have arrived at the BS with various time delays into only one time zone. That is, when the CP is configured to be suitable for a maximum radius of the cell, PRACH preambles transmitted by UEs belonging to the cell using the same resources may enter the PRACH reception window corresponding to the BS-configured PRACH preamble length required for PRACH reception. Generally, the CP length may be equal to or greater than a maximum round trip delay.

Preamble: A sequence for allowing the B S to detect information about signal transmission may be defined, and a preamble may be used to carry the sequence.

Guard Time (GT): The guard time (GT) may be defined to prevent the PRACH signal (that is transmitted from a location farthest from the BS, is delayed, and is applied to the BS on the PRACH coverage) from interfering with the other signal received after lapse of the PRACH symbol duration. During the guard time (GT), the UE does not transmit signals, so that the GT may not be defined as a PRACH signal.

2.5. Mapping to Physical Resources for Physical Random-Access Channel

The random access preamble may be transmitted only within a time resource that is obtained based on a table (i.e., RACH configuration table) preset for a RACH configuration, FR1 and FR2, and a preset spectrum type.

PRACH configuration index contained in the RACH configuration table can be given as follows.

For the RACH configuration table for "Random access configurations for FR1 and unpaired spectrum", the PRACH configuration index can be given from a higher layer parameter "prach-ConfigurationIndexNew (if configured)". Otherwise, the PRACH configuration index can be given from 'prach-ConfigurationIndex', 'msgA-prach-ConfigurationIndex', or 'msgA-prach-ConfigurationIndexNew (if configured)'.

For the RACH configuration table regarding "Random access configurations for FR1 and paired spectrum/ supplementary uplink" and for the RACH configuration table regarding "Random access configurations for FR2 and unpaired spectrum", the PRACH configuration index can be given from higher layer parameters "prach-ConfigurationIndex" and/or "msgA-prach-ConfigurationIndexNew (if configured)".

The RACH configuration table may refer to a table indicating the relationship of one or more elements from among "PRACH configuration Index", "Preamble format", "nSFN mod x=y", "Subframe number", "Starting symbol", "Number of PRACH slots within a subframe (number of time-domain PRACH occasions within a PRACH slot), and "(PRACH duration)" for use in the respective cases.

The respective cases may be as follows.

(1) Random access configurations for FR1 and paired spectrum/supplementary uplink (2) Random access configurations for FR1 and unpaired spectrum (3) Random access configurations for FR2 and unpaired spectrum Tables 13 to 17 illustrate examples of the RACH configuration table for "(2) Random access configurations for FR1 and unpaired spectrum".

TABLE 13

| PRACH Configuration Index | Preamble format | $n_{SFN} \bmod x = y$ | | Subframe number | Starting symbol | Number of PRACH slots within a subframe | $N_t^{RA,slot}$ number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |
| 10 | 0 | 1 | 0 | 6 | 0 | — | — | 0 |
| 11 | 0 | 1 | 0 | 5 | 0 | — | — | 0 |
| 12 | 0 | 1 | 0 | 4 | 0 | — | — | 0 |
| 13 | 0 | 1 | 0 | 3 | 0 | — | — | 0 |
| 14 | 0 | 1 | 0 | 2 | 0 | — | — | 0 |
| 15 | 0 | 1 | 0 | 1, 6 | 0 | — | — | 0 |
| 16 | 0 | 1 | 0 | 1, 6 | 7 | — | — | 0 |
| 17 | 0 | 1 | 0 | 4, 9 | 0 | — | — | 0 |
| 18 | 0 | 1 | 0 | 3, 8 | 0 | — | — | 0 |
| 19 | 0 | 1 | 0 | 2, 7 | 0 | — | — | 0 |
| 20 | 0 | 1 | 0 | 8, 9 | 0 | — | — | 0 |
| 21 | 0 | 1 | 0 | 4, 8, 9 | 0 | — | — | 0 |
| 22 | 0 | 1 | 0 | 3, 4, 9 | 0 | — | — | 0 |
| 23 | 0 | 1 | 0 | 7, 8, 9 | 0 | — | — | 0 |
| 24 | 0 | 1 | 0 | 3, 4, 8, 9 | 0 | — | — | 0 |
| 25 | 0 | 1 | 0 | 6, 7, 8, 9 | 0 | — | — | 0 |
| 26 | 0 | 1 | 0 | 1, 4, 6, 9 | 0 | — | — | 0 |
| 27 | 0 | 1 | 0 | 1, 3, 5, 7, 9 | 0 | — | — | 0 |
| 28 | 1 | 16 | 1 | 7 | 0 | — | — | 0 |
| 29 | 1 | 8 | 1 | 7 | 0 | — | — | 0 |
| 30 | 1 | 4 | 1 | 7 | 0 | — | — | 0 |
| 31 | 1 | 2 | 0 | 7 | 0 | — | — | 0 |
| 32 | 1 | 2 | 1 | 7 | 0 | — | — | 0 |
| 33 | 1 | 1 | 0 | 7 | 0 | — | — | 0 |
| 34 | 2 | 16 | 1 | 6 | 0 | — | — | 0 |
| 35 | 2 | 8 | 1 | 6 | 0 | — | — | 0 |
| 36 | 2 | 4 | 1 | 6 | 0 | — | — | 0 |
| 37 | 2 | 2 | 0 | 6 | 7 | — | — | 0 |
| 38 | 2 | 2 | 1 | 6 | 7 | — | — | 0 |
| 39 | 2 | 1 | 0 | 6 | 7 | — | — | 0 |
| 40 | 3 | 16 | 1 | 9 | 0 | — | — | 0 |
| 41 | 3 | 8 | 1 | 9 | 0 | — | — | 0 |
| 42 | 3 | 4 | 1 | 9 | 0 | — | — | 0 |
| 43 | 3 | 2 | 0 | 9 | 0 | — | — | 0 |
| 44 | 3 | 2 | 1 | 9 | 0 | — | — | 0 |
| 45 | 3 | 2 | 0 | 4 | 0 | — | — | 0 |
| 46 | 3 | 2 | 1 | 4 | 0 | — | — | 0 |
| 47 | 3 | 1 | 0 | 9 | 0 | — | — | 0 |
| 48 | 3 | 1 | 0 | 8 | 0 | — | — | 0 |
| 49 | 3 | 1 | 0 | 7 | 0 | — | — | 0 |
| 50 | 3 | 1 | 0 | 6 | 0 | — | — | 0 |
| 51 | 3 | 1 | 0 | 5 | 0 | — | — | 0 |
| 52 | 3 | 1 | 0 | 4 | 0 | — | — | 0 |
| 53 | 3 | 1 | 0 | 3 | 0 | — | — | 0 |
| 54 | 3 | 1 | 0 | 2 | 0 | — | — | 0 |
| 55 | 3 | 1 | 0 | 1, 6 | 0 | — | — | 0 |

TABLE 14

| 56 | 3 | 1 | 0 | 1, 6 | 7 | — | — | 0 |
| 57 | 3 | 1 | 0 | 4, 9 | 0 | — | — | 0 |
| 58 | 3 | 1 | 0 | 3, 8 | 0 | — | — | 0 |
| 59 | 3 | 1 | 0 | 2, 7 | 0 | — | — | 0 |
| 60 | 3 | 1 | 0 | 8, 9 | 0 | — | — | 0 |
| 61 | 3 | 1 | 0 | 4, 8, 9 | 0 | — | — | 0 |
| 62 | 3 | 1 | 0 | 3, 4, 9 | 0 | — | — | 0 |
| 63 | 3 | 1 | 0 | 7, 8, 9 | 0 | — | — | 0 |
| 64 | 3 | 1 | 0 | 3, 4, 8, 9 | 0 | — | — | 0 |
| 65 | 3 | 1 | 0 | 1, 4, 6, 9 | 0 | — | — | 0 |
| 66 | 3 | 1 | 0 | 1, 3, 5, 7, 9 | 0 | — | — | 0 |
| 67 | A1 | 16 | 1 | 9 | 0 | 2 | 6 | 2 |
| 68 | A1 | 8 | 1 | 9 | 0 | 2 | 6 | 2 |
| 69 | A1 | 4 | 1 | 9 | 0 | 1 | 6 | 2 |

TABLE 14-continued

| | | | | | | | | |
|---|---|---|---|---|---|---|---|---|
| 70 | A1 | 2 | 1 | 9 | 0 | 1 | 6 | 2 |
| 71 | A1 | 2 | 1 | 4, 9 | 7 | 1 | 3 | 2 |
| 72 | A1 | 2 | 1 | 7, 9 | 7 | 1 | 3 | 2 |
| 73 | A1 | 2 | 1 | 7, 9 | 0 | 1 | 6 | 2 |
| 74 | A1 | 2 | 1 | 8, 9 | 0 | 2 | 6 | 2 |
| 75 | A1 | 2 | 1 | 4, 9 | 0 | 2 | 6 | 2 |
| 76 | A1 | 2 | 1 | 2, 3, 4, 7, 8, 9 | 0 | 1 | 6 | 2 |
| 77 | A1 | 1 | 0 | 9 | 0 | 2 | 6 | 2 |
| 78 | A1 | 1 | 0 | 9 | 7 | 1 | 3 | 2 |
| 79 | A1 | 1 | 0 | 9 | 0 | 1 | 6 | 2 |
| 80 | A1 | 1 | 0 | 8, 9 | 0 | 2 | 6 | 2 |
| 81 | A1 | 1 | 0 | 4, 9 | 0 | 1 | 6 | 2 |
| 82 | A1 | 1 | 0 | 7, 9 | 7 | 1 | 3 | 2 |
| 83 | A1 | 1 | 0 | 3, 4, 8, 9 | 0 | 1 | 6 | 2 |
| 84 | A1 | 1 | 0 | 3, 4, 8, 9 | 0 | 2 | 6 | 2 |
| 85 | A1 | 1 | 0 | 1, 3, 5, 7, 9 | 0 | 1 | 6 | 2 |
| 86 | A1 | 1 | 0 | 0, 1, 2, 3, 4, 5, 6, 7, 8, 9 | 7 | 1 | 3 | 2 |
| 87 | A2 | 16 | 1 | 9 | 0 | 2 | 3 | 4 |
| 88 | A2 | 8 | 1 | 9 | 0 | 2 | 3 | 4 |
| 89 | A2 | 4 | 1 | 9 | 0 | 1 | 3 | 4 |
| 90 | A2 | 2 | 1 | 7, 9 | 0 | 1 | 3 | 4 |
| 91 | A2 | 2 | 1 | 8, 9 | 0 | 2 | 3 | 4 |
| 92 | A2 | 2 | 1 | 7, 9 | 9 | 1 | 1 | 4 |
| 93 | A2 | 2 | 1 | 4, 9 | 9 | 1 | 1 | 4 |
| 94 | A2 | 2 | 1 | 4, 9 | 0 | 2 | 3 | 4 |
| 95 | A2 | 2 | 1 | 2, 3, 4, 7, 8, 9 | 0 | 1 | 3 | 4 |
| 96 | A2 | 1 | 0 | 2 | 0 | 1 | 3 | 4 |
| 97 | A2 | 1 | 0 | 7 | 0 | 1 | 3 | 4 |
| 98 | A2 | 2 | 1 | 9 | 0 | 1 | 3 | 4 |
| 99 | A2 | 1 | 0 | 9 | 0 | 2 | 3 | 4 |
| 100 | A2 | 1 | 0 | 9 | 9 | 1 | 1 | 4 |
| 101 | A2 | 1 | 0 | 9 | 0 | 1 | 3 | 4 |
| 102 | A2 | 1 | 0 | 2, 7 | 0 | 1 | 3 | 4 |
| 103 | A2 | 1 | 0 | 8, 9 | 0 | 2 | 3 | 4 |
| 104 | A2 | 1 | 0 | 4, 9 | 0 | 1 | 3 | 4 |
| 105 | A2 | 1 | 0 | 7, 9 | 9 | 1 | 1 | 4 |
| 106 | A2 | 1 | 0 | 3, 4, 8, 9 | 0 | 1 | 3 | 4 |
| 107 | A2 | 1 | 0 | 3, 4, 8, 9 | 0 | 2 | 3 | 4 |
| 108 | A2 | 1 | 0 | 1, 3, 5, 7, 9 | 0 | 1 | 3 | 4 |
| 109 | A2 | 1 | 0 | 0, 1, 2, 3, 4, 5, 6, 7, 8, 9 | 9 | 1 | 1 | 4 |
| 110 | A3 | 16 | 1 | 9 | 0 | 2 | 2 | 6 |
| 111 | A3 | 8 | 1 | 9 | 0 | 2 | 2 | 6 |
| 112 | A3 | 4 | 1 | 9 | 0 | 1 | 2 | 6 |
| 113 | A3 | 2 | 1 | 4, 9 | 7 | 1 | 1 | 6 |
| 114 | A3 | 2 | 1 | 7, 9 | 7 | 1 | 1 | 6 |
| 115 | A3 | 2 | 1 | 7, 9 | 0 | 1 | 2 | 6 |
| 116 | A3 | 2 | 1 | 4, 9 | 0 | 2 | 2 | 6 |
| 117 | A3 | 2 | 1 | 8, 9 | 0 | 2 | 2 | 6 |
| 118 | A3 | 2 | 1 | 2, 3, 4, 7, 8, 9 | 0 | 1 | 2 | 6 |
| 119 | A3 | 1 | 0 | 2 | 0 | 1 | 2 | 6 |
| 120 | A3 | 1 | 0 | 7 | 0 | 1 | 2 | 6 |

TABLE 15

| | | | | | | | | |
|---|---|---|---|---|---|---|---|---|
| 121 | A3 | 2 | 1 | 9 | 0 | 1 | 2 | 6 |
| 122 | A3 | 1 | 0 | 9 | 0 | 2 | 2 | 6 |
| 123 | A3 | 1 | 0 | 9 | 7 | 1 | 1 | 6 |
| 124 | A3 | 1 | 0 | 9 | 0 | 1 | 2 | 6 |
| 125 | A3 | 1 | 0 | 2, 7 | 0 | 1 | 2 | 6 |
| 126 | A3 | 1 | 0 | 8, 9 | 0 | 2 | 2 | 6 |
| 127 | A3 | 1 | 0 | 4, 9 | 0 | 1 | 2 | 6 |
| 128 | A3 | 1 | 0 | 7, 9 | 7 | 1 | 1 | 6 |
| 129 | A3 | 1 | 0 | 3, 4, 8, 9 | 0 | 1 | 2 | 6 |
| 130 | A3 | 1 | 0 | 3, 4, 8, 9 | 0 | 2 | 2 | 6 |
| 131 | A3 | 1 | 0 | 1, 3, 5, 7, 9 | 0 | 1 | 2 | 6 |
| 132 | A3 | 1 | 0 | 0, 1, 2, 3, 4, 5, 6, 7, 8, 9 | 7 | 1 | 1 | 6 |
| 133 | B1 | 4 | 1 | 9 | 2 | 1 | 6 | 2 |
| 134 | B1 | 2 | 1 | 9 | 2 | 1 | 6 | 2 |
| 135 | B1 | 2 | 1 | 7, 9 | 2 | 1 | 6 | 2 |
| 136 | B1 | 2 | 1 | 4, 9 | 8 | 1 | 3 | 2 |
| 137 | B1 | 2 | 1 | 4, 9 | 2 | 2 | 6 | 2 |
| 138 | B1 | 1 | 0 | 9 | 2 | 2 | 6 | 2 |
| 139 | B1 | 1 | 0 | 9 | 8 | 1 | 3 | 2 |
| 140 | B1 | 1 | 0 | 9 | 2 | 1 | 6 | 2 |
| 141 | B1 | 1 | 0 | 8, 9 | 2 | 2 | 6 | 2 |
| 142 | B1 | 1 | 0 | 4, 9 | 2 | 1 | 6 | 2 |
| 143 | B1 | 1 | 0 | 7, 9 | 8 | 1 | 3 | 2 |

TABLE 15-continued

| | | | | | | | | |
|---|---|---|---|---|---|---|---|---|
| 144 | B1 | 1 | 0 | 1, 3, 5, 7, 9 | 2 | 1 | 6 | 2 |
| 145 | B4 | 16 | 1 | 9 | 0 | 2 | 1 | 12 |
| 146 | B4 | 8 | 1 | 9 | 0 | 2 | 1 | 12 |
| 147 | B4 | 4 | 1 | 9 | 2 | 1 | 1 | 12 |
| 148 | B4 | 2 | 1 | 9 | 0 | 1 | 1 | 12 |
| 149 | B4 | 2 | 1 | 9 | 2 | 1 | 1 | 12 |
| 150 | B4 | 2 | 1 | 7, 9 | 2 | 1 | 1 | 12 |
| 151 | B4 | 2 | 1 | 4, 9 | 2 | 1 | 1 | 12 |
| 152 | B4 | 2 | 1 | 4, 9 | 0 | 2 | 1 | 12 |
| 153 | B4 | 2 | 1 | 8, 9 | 0 | 2 | 1 | 12 |
| 154 | B4 | 2 | 1 | 2, 3, 4, 7, 8, 9 | 0 | 1 | 1 | 12 |
| 155 | B4 | 1 | 0 | 1 | 0 | 1 | 1 | 12 |
| 156 | B4 | 1 | 0 | 2 | 0 | 1 | 1 | 12 |
| 157 | B4 | 1 | 0 | 4 | 0 | 1 | 1 | 12 |
| 158 | B4 | 1 | 0 | 7 | 0 | 1 | 1 | 12 |
| 159 | B4 | 1 | 0 | 9 | 0 | 1 | 1 | 12 |
| 160 | B4 | 1 | 0 | 9 | 2 | 1 | 1 | 12 |
| 161 | B4 | 1 | 0 | 9 | 0 | 2 | 1 | 12 |
| 162 | B4 | 1 | 0 | 4, 9 | 2 | 1 | 1 | 12 |
| 163 | B4 | 1 | 0 | 7, 9 | 2 | 1 | 1 | 12 |
| 164 | B4 | 1 | 0 | 8, 9 | 0 | 2 | 1 | 12 |
| 165 | B4 | 1 | 0 | 3, 4, 8, 9 | 2 | 1 | 1 | 12 |
| 165 | B4 | 1 | 0 | 1, 3, 5, 7, 9 | 2 | 1 | 1 | 12 |
| 167 | B4 | 1 | 0 | 0, 1, 2, 3, 4, 5, 6, 7, 8, 9 | 0 | 2 | 1 | 12 |
| 168 | B4 | 1 | 0 | 0, 1, 2, 3, 4, 5, 6, 7, 8, 9 | 2 | 1 | 1 | 12 |
| 169 | C0 | 16 | 1 | 9 | 2 | 2 | 6 | 2 |
| 170 | C0 | 8 | 1 | 9 | 2 | 2 | 6 | 2 |
| 171 | C0 | 4 | 1 | 9 | 2 | 1 | 6 | 2 |
| 172 | C0 | 2 | 1 | 9 | 2 | 1 | 6 | 2 |
| 173 | C0 | 2 | 1 | 8, 9 | 2 | 2 | 6 | 2 |
| 174 | C0 | 2 | 1 | 7, 9 | 2 | 1 | 6 | 2 |
| 175 | C0 | 2 | 1 | 7, 9 | 8 | 1 | 3 | 2 |
| 176 | C0 | 2 | 1 | 4, 9 | 8 | 1 | 3 | 2 |
| 177 | C0 | 2 | 1 | 4, 9 | 2 | 2 | 6 | 2 |
| 178 | C0 | 2 | 1 | 2, 3, 4, 7, 8, 9 | 2 | 1 | 6 | 2 |
| 179 | C0 | 1 | 0 | 9 | 2 | 2 | 6 | 2 |
| 180 | C0 | 1 | 0 | 9 | 8 | 1 | 3 | 2 |
| 181 | C0 | 1 | 0 | 9 | 2 | 1 | 6 | 2 |
| 182 | C0 | 1 | 0 | 8, 9 | 2 | 2 | 6 | 2 |
| 183 | C0 | 1 | 0 | 4, 9 | 2 | 1 | 6 | 2 |
| 184 | C0 | 1 | 0 | 7, 9 | 8 | 1 | 3 | 2 |
| 185 | C0 | 1 | 0 | 3, 4, 8, 9 | 2 | 1 | 6 | 2 |

TABLE 16

| | | | | | | | | |
|---|---|---|---|---|---|---|---|---|
| 186 | C0 | 1 | 0 | 3, 4, 8, 9 | 2 | 2 | 6 | 2 |
| 187 | C0 | 1 | 0 | 1, 3, 5, 7, 9 | 2 | 1 | 6 | 2 |
| 188 | C0 | 1 | 0 | 0, 1, 2, 3, 4, 5, 6, 7, 8, 9 | 8 | 1 | 3 | 2 |
| 189 | C2 | 16 | 1 | 9 | 2 | 2 | 2 | 6 |
| 190 | C2 | 8 | 1 | 9 | 2 | 2 | 2 | 6 |
| 191 | C2 | 4 | 1 | 9 | 2 | 1 | 2 | 6 |
| 192 | C2 | 2 | 1 | 9 | 2 | 1 | 2 | 6 |
| 193 | C2 | 2 | 1 | 8, 9 | 2 | 2 | 2 | 6 |
| 194 | C2 | 2 | 1 | 7, 9 | 2 | 1 | 2 | 6 |
| 195 | C2 | 2 | 1 | 7, 9 | 8 | 1 | 1 | 6 |
| 196 | C2 | 2 | 1 | 4, 9 | 8 | 1 | 1 | 6 |
| 197 | C2 | 2 | 1 | 4, 9 | 2 | 2 | 2 | 6 |
| 198 | C2 | 2 | 1 | 2, 3, 4, 7, 8,9 | 2 | 1 | 2 | 6 |
| 199 | C2 | 8 | 1 | 9 | 8 | 2 | 1 | 6 |
| 200 | C2 | 4 | 1 | 9 | 8 | 1 | 1 | 6 |
| 201 | C2 | 1 | 0 | 9 | 2 | 2 | 2 | 6 |
| 202 | C2 | 1 | 0 | 9 | 8 | 1 | 1 | 6 |
| 203 | C2 | 1 | 0 | 9 | 2 | 1 | 2 | 6 |
| 204 | C2 | 1 | 0 | 8, 9 | 2 | 2 | 2 | 6 |
| 205 | C2 | 1 | 0 | 4, 9 | 2 | 1 | 2 | 6 |
| 206 | C2 | 1 | 0 | 7, 9 | 8 | 1 | 1 | 6 |
| 207 | C2 | 1 | 0 | 3, 4, 8, 9 | 2 | 1 | 2 | 6 |
| 208 | C2 | 1 | 0 | 3, 4, 8, 9 | 2 | 2 | 2 | 6 |
| 209 | C2 | 1 | 0 | 1, 3, 5, 7, 9 | 2 | 1 | 2 | 6 |
| 210 | C2 | 1 | 0 | 0, 1, 2, 3, 4, 5, 6, 7, 8, 9 | 8 | 1 | 1 | 6 |
| 211 | A1/B1 | 2 | 1 | 9 | 2 | 1 | 6 | 2 |
| 212 | A1/B1 | 2 | 1 | 4, 9 | 8 | 1 | 3 | 2 |
| 213 | A1/B1 | 2 | 1 | 7, 9 | 8 | 1 | 3 | 2 |
| 214 | A1/B1 | 2 | 1 | 4, 9 | 2 | 1 | 6 | 2 |
| 215 | A1/B1 | 2 | 1 | 4, 9 | 2 | 2 | 6 | 2 |
| 216 | A1/B1 | 2 | 1 | 8, 9 | 2 | 2 | 6 | 2 |
| 217 | A1/B1 | 1 | 0 | 9 | 2 | 2 | 6 | 2 |

TABLE 16-continued

| | | | | | | | | |
|---|---|---|---|---|---|---|---|---|
| 218 | A1/B1 | 1 | 0 | 9 | 8 | 1 | 3 | 2 |
| 219 | A1/B1 | 1 | 0 | 9 | 2 | 1 | 6 | 2 |
| 220 | A1/B1 | 1 | 0 | 8, 9 | 2 | 2 | 6 | 2 |
| 221 | A1/B1 | 1 | 0 | 4, 9 | 2 | 1 | 6 | 2 |
| 222 | A1/B1 | 1 | 0 | 7, 9 | 8 | 1 | 3 | 2 |
| 223 | A1/B1 | 1 | 0 | 3, 4, 8, 9 | 2 | 2 | 6 | 2 |
| 224 | A1/B1 | 1 | 0 | 1, 3, 5, 7, 9 | 2 | 1 | 6 | 2 |
| 225 | A1/B1 | 1 | 0 | 0, 1, 2, 3, 4, 5, 6, 7, 8, 9 | 8 | 1 | 3 | 2 |
| 226 | A2/B2 | 2 | 1 | 9 | 0 | 1 | 3 | 4 |
| 227 | A2/B2 | 2 | 1 | 4, 9 | 6 | 1 | 2 | 4 |
| 228 | A2/B2 | 2 | 1 | 7, 9 | 6 | 1 | 2 | 4 |
| 229 | A2/B2 | 2 | 1 | 4, 9 | 0 | 2 | 3 | 4 |
| 230 | A2/B2 | 2 | 1 | 8, 9 | 0 | 2 | 3 | 4 |
| 231 | A2/B2 | 1 | 0 | 9 | 0 | 2 | 3 | 4 |
| 232 | A2/B2 | 1 | 0 | 9 | 6 | 1 | 2 | 4 |
| 233 | A2/B2 | 1 | 0 | 9 | 0 | 1 | 3 | 4 |
| 234 | A2/B2 | 1 | 0 | 8, 9 | 0 | 2 | 3 | 4 |
| 235 | A2/B2 | 1 | 0 | 4, 9 | 0 | 1 | 3 | 4 |
| 236 | A2/B2 | 1 | 0 | 7, 9 | 6 | 1 | 2 | 4 |
| 237 | A2/B2 | 1 | 0 | 3, 4, 8, 9 | 0 | 1 | 3 | 4 |
| 238 | A2/B2 | 1 | 0 | 3, 4, 8, 9 | 0 | 2 | 3 | 4 |
| 239 | A2/B2 | 1 | 0 | 1, 3, 5, 7, 9 | 0 | 1 | 3 | 4 |
| 240 | A2/B2 | 1 | 0 | 0, 1, 2, 3, 4, 5, 6, 7, 8, 9 | 6 | 1 | 2 | 4 |
| 241 | A3/B3 | 2 | 1 | 9 | 0 | 1 | 2 | 6 |
| 242 | A3/B3 | 2 | 1 | 4, 9 | 2 | 1 | 2 | 6 |
| 243 | A3/B3 | 2 | 1 | 7, 9 | 0 | 1 | 2 | 6 |
| 244 | A3/B3 | 2 | 1 | 7, 9 | 2 | 1 | 2 | 6 |
| 245 | A3/B3 | 2 | 1 | 4, 9 | 0 | 2 | 2 | 6 |
| 246 | A3/B3 | 2 | 1 | 8, 9 | 0 | 2 | 2 | 6 |
| 247 | A3/B3 | 1 | 0 | 9 | 0 | 2 | 2 | 6 |
| 248 | A3/B3 | 1 | 0 | 9 | 2 | 1 | 2 | 6 |
| 249 | A3/B3 | 1 | 0 | 9 | 0 | 1 | 2 | 6 |
| 250 | A3/B3 | 1 | 0 | 8, 9 | 0 | 2 | 2 | 6 |

TABLE 17

| | | | | | | | | |
|---|---|---|---|---|---|---|---|---|
| 251 | A3/B3 | 1 | 0 | 4, 9 | 0 | 1 | 2 | 6 |
| 252 | A3/B3 | 1 | 0 | 7, 9 | 2 | 1 | 2 | 6 |
| 253 | A3/B3 | 1 | 0 | 3, 4, 8, 9 | 0 | 2 | 2 | 6 |
| 254 | A3/B3 | 1 | 0 | 1, 3, 5, 7, 9 | 0 | 1 | 2 | 6 |
| 255 | A3/B3 | 1 | 0 | 0, 1, 2, 3, 4, 5, 6, 7, 8, 9 | 2 | 1 | 2 | 6 |
| 256 | 0 | 16 | 1 | 7 | 0 | — | — | 0 |
| 257 | 0 | 8 | 1 | 7 | 0 | — | — | 0 |
| 258 | 0 | 4 | 1 | 7 | 0 | — | — | 0 |
| 259 | 0 | 2 | 0 | 7 | 0 | — | — | 0 |
| 260 | 0 | 2 | 1 | 7 | 0 | — | — | 0 |
| 261 | 0 | 2 | 0 | 2 | 0 | — | — | 0 |
| 262 | 0 | 2 | 1 | 2 | 0 | — | — | 0 |

3. Various Embodiments of the Present Disclosure

A detailed description will be given of various embodiments of the present disclosure based on the above technical ideas. The afore-described contents of clause 1 and clause 2 are applicable to various embodiments of the present disclosure described below. For example, operations, functions, terminologies, and so on which are not defined in various embodiments of the present disclosure may be performed and described based on clause 1 and clause 2.

Symbols/abbreviations/terms used in the description of various embodiments of the present disclosure may be defined as follows.

CDM: code domain multiplexing (code domain sharing)
DL: downlink
DM-RS (DMRS): demodulation reference signal
FDM: frequency division multiplexing (frequency domain sharing)
MAC: medium access control
MAC CE: MAC control element
MCS: modulation and coding scheme
OFDM: orthogonal frequency division multiplexing
PRACH: physical random access channel
PRB: physical resource block
PUSCH: physical uplink shared channel
RA: random access
RACH: random access channel
RAPID: random access preamble identifier
RAR: random access response
RB: resource block
RE: resource element
RNTI: radio network temporary identifier
RO: RACH occasion or PRACH occasion
SC: subcarrier
TDM: time division multiplexing (time domain sharing)
UL: uplink As more and more communication devices demand larger communication traffic according to the advent of the new era, the need for 5G system serving as enhanced mobile broadband communication relative to the LTE system has emerged. For convenience, the next-generation 5G system is referred to as new RAT (NR) in the present disclosure.

The NR system can support the 2-step RACH procedure in addition to the 4-step RACH procedure.

2-step RACH procedure may be a procedure in which the legacy RACH operation comprised of a 4-step RACH procedure is simplified into a 2-step RACH procedure for faster initial access.

In the 2-step RACH procedure, the message (A) may include a PRACH preamble included in a message '1' and a PUSCH included in a message '3'. In the 2-step RACH procedure, the message (B) may include a random access response (RAR) included in a message '2' and contention resolution information included in a message '4'.

Various embodiments of the present disclosure may be configured for association between the PRACH preamble included in the message 'A' and the PUSCH in the 2-step RACH procedure.

Various embodiments of the present disclosure may relate to a resource allocation method for transmitting the corresponding PUSCH and/or a method for enabling the BS to receive the PUSCH in a situation where multiple PUSCHs associated with one RACH occasion are transmitted (i.e., a one-to-multiple scheme).

The operation for configuring a plurality of PUSCH resource sets (or aggregates) in the one-to-multiple scheme according to various embodiments of the present disclosure can be used after being combined with at least one selected from among the initial access (IA) and random access (RA).

The operation for configuring a plurality of PUSCH resource sets in the one-to-multiple scheme according to various embodiments of the present disclosure can be executed in relation to at least one selected from among initial access (IA) and/or the random access (RA). UE operation and BS operation according to embodiments of the present disclosure will hereinafter be described with reference to the attached drawings.

For example, the UE operation may be as follows.

For example, the UE may receive parameters and/or control information that can be defined or configured to perform methods proposed by various embodiments of the present disclosure, from the BS through (1) signaling information (e.g., DCI, MAC CE, reference signal and/or synchronization signal) received via the initial access procedure (or a random access procedure included in the initial access procedure) and/or through (2) other signaling information (e.g., DCI, MAC CE, reference signal, synchronization signal, and/or RRC signaling, etc.) received in the RRC connected state after completion of the initial access procedure (or the random access procedure included in the initial access procedure).

For example, the UE may perform at least one of methods according to various embodiments of the present disclosure, after completion of the initial access procedure (or the random access procedure included in the initial access procedure) based on the received parameters (or configured parameters).

For example, the BS operation may be as follows.

For example, the BS may transmit parameters and/or control information configured to perform methods proposed by various embodiments of the present disclosure, to the UE through (1) specific signaling information (e.g., DCI, MAC CE, reference signal and/or synchronization signal) after completion of the initial access procedure (or a random access procedure included in the initial access procedure) and/or through (2) other signaling information (e.g., DCI, MAC CE, reference signal, synchronization signal, and/or RRC signaling, etc.) configured in the RRC connected state after completion of the initial access procedure (or the random access procedure included in the initial access procedure).

For example, the BS may perform one or more methods proposed by various embodiments after completion of the initial access procedure (or the random access procedure included in the initial access procedure) based on the corresponding parameters.

As an example of various embodiments of the present disclosure, the operation for configuring parameters and/or UE/BS operations required to perform the methods proposed in various embodiments may be performed in association with the operations mentioned in the present document.

The operation of configuring the plurality of PUSCH resource sets in the one-to-multiple scheme according to various embodiments of the present disclosure can be applied to the procedure for receiving the PDCCH (and/or NPDCCH and/or MPDCCH, etc.) during the ON duration of the DRX cycle and performing transition to the RRC connected state. UE and BS operations according to embodiments of the present disclosure will hereinafter be described.

The following procedure to be described may be performed independently, or may be performed in association with the initial access procedure and/or the random access procedure.

For example, when the following procedure is performed in association with the initial access procedure and/or the random access procedure, the following procedure to be described may be associated with the operation for enabling the UE and/or the BS to perform the initial access procedure and/or the random access procedure during a cell (re) selection process to be performed after transmission and reception of the paging message in the DRX mode.

For example, the UE operation may be as follows.

For example, the UE may receive parameters and/or control information that can be defined or configured to perform methods proposed by various embodiments of the present disclosure, from the BS through (1) signaling information (e.g., DCI, MAC CE, reference signal and/or synchronization signal) received in association with the DRX operation, through (2) the paging message, and/or through (3) RRC signaling in the RRC connected state.

For example, the UE may receive the paging message in the DRX cycle based on the received (or configured) parameters, and may receive at least one of methods applicable to various embodiments of the present disclosure during the RRC connected state.

For example, the BS operation may be as follows.

For example, the BS may transmit parameters and/or control information configured to perform methods proposed by various embodiments of the present disclosure, to the UE through (1) specific signaling information (e.g., DCI, MAC CE, reference signal, synchronization signal, and/or RRC signaling) after setting the DRX-related procedure, through (2) the paging message, and/or through RRC signaling.

For example, the BS may perform one or more methods proposed by various embodiments after transmitting the paging message in the DRX cycle based on the corresponding parameters.

As an example of various embodiments of the present disclosure, the operation for configuring parameters and/or UE/BS operations required to perform the methods proposed in various embodiments may be performed in association with the operations mentioned in the present document.

In the LTE and/or NR system, the UE may transmit UL signals in the random access procedure without receiving information about the operation of scheduling UL signals directly transmitted from the given BS and/or cell. In the LTE and/or NR system, the random access procedure may include a preamble transmission process, a Msg2 reception process, a Msg3 transmission process, and a Msg4 reception process from the viewpoint of the UE.

Msg2 may be a message for enabling the BS having received a random preamble to allocate UL resources through which the UE having transmitted the corresponding preamble is scheduled to transmit the message 3. Through Msg3, the UE can transmit not only its own ID (e.g., S-TMSI (SAE-Temporary Mobile Subscriber Identity), a random value, or the like) but also information such as a connection request.

The BS having received Msg3 may transmit the ID of the corresponding UE and/or necessary information through Msg4, so that the BS can perform contention resolution about random access collision between different UEs.

In order to simplify the processing delay of the above-mentioned 4-step RACH procedure, the 2-step RACH procedure is being actively discussed to be utilized for a small cell and/or an unlicensed bandwidth (or a shared spectrum).

2-step RACH procedure may refer to an operation mode in which the UE directly transmits a message corresponding to Msg3 as well as the preamble, and the BS may perform collision resolution by responding to the Msg3 message using a message corresponding to Msg4. For convenience of description, all messages corresponding to Msg3 and the preamble for use in the 2-step RACH procedure will hereinafter be referred to as MsgA (Message A), and all messages corresponding to Msg2 and Msg4 will hereinafter be referred to as MsgB (Message B).

Figure 21:
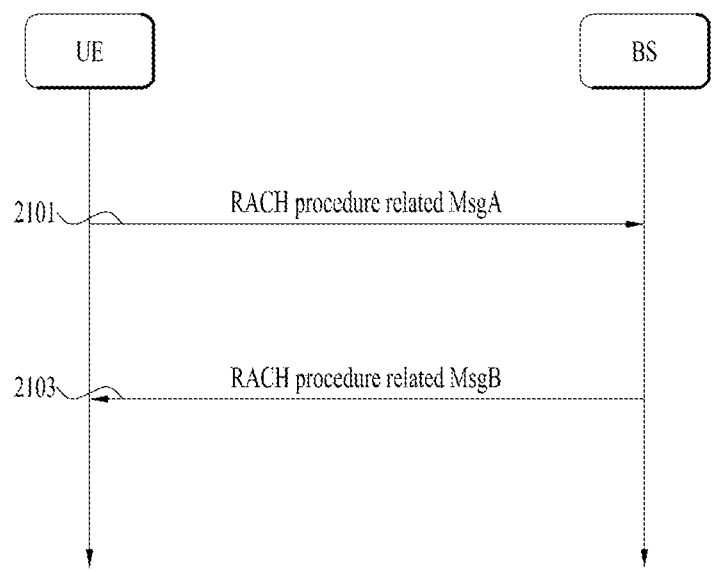
FIG. 21 is a flowchart illustrating one example of a 2-step RACH procedure according to various embodiments of the present disclosure.

FIG. 21 is a flowchart illustrating one example of the 2-step RACH procedure according to various embodiments of the present disclosure.

Referring to FIG. 21, in step 2101, the BS may broadcast information related to RACH transmission using system information (SI), and the UE may transmit MsgA to the BS based on the broadcast (or transmitted) information.

For example, MsgA may include a preamble and data (PUSCH).

For example, PUSCH may be consecutively transmitted in the preamble and the time domain, and/or may be periodically transmitted at intervals of a predetermined time gap.

For example, PUSCH may include ID information of the UE.

For example, the BS may predict the corresponding gap and/or consecutive PUSCHs based on the detected preamble, and/or may receive the predicted gap and consecutive PUSCHs.

In step 2103, the BS may receive an access request and/or response from a higher layer (or upper layer) using UE ID information received through PUSCH (or included in PUSCH), and may transmit information related to contention resolution through MsgB For example, the UE may determine whether MsgB was received, and may perform the same and/or similar operation after completion of such Msg4 reception in the 4-step RACH procedure.

After receiving the access request and response from the higher layer through UE ID information transmitted on PUSCH, the UE may receive contention resolution information through MsgB. Depending on whether MsgB is received, the UE may perform the same or similar operation after the legacy 4-step UE has received Msg4.

For example, the method for transmitting MsgA may include a multiple-to-one mapping scheme (1) in which all PUSCHs are transmitted to one PUSCH resource set in association with all preambles transmitted in multiple ROs (multiple RACH occasions), a one-to-one mapping scheme (2) in which one PUSCH resource set is allocated to only one RO, and a one-to-multiple mapping scheme (3) in which multiple PUSCH resource sets are allocated to only one RO.

For example, the (PUSCH) resource set may refer to the entire time/frequency resources of all PUSCH resources that can be transmitted in correspondence to one RO. For example, all or some of the corresponding time/frequency resources can be used according to the data size of PUSCH and/or MCS (modulation and coding scheme) within the corresponding time/frequency resources, and these time/frequency resources may be referred to as a set (or aggregate). For example, the PUSCH resource set according to various embodiments of the present disclosure can be understood as PUSCH occasion/resources or can be understood as being associated with the same.

Various embodiments of the present disclosure may relate to a method for configuring a plurality of PUSCH resource sets in association with the one-to-multiple (mapping) scheme, or may relate to UE/BS operations for use in the case where MsgA is transmitted using the above configuration method.

Figure 22:
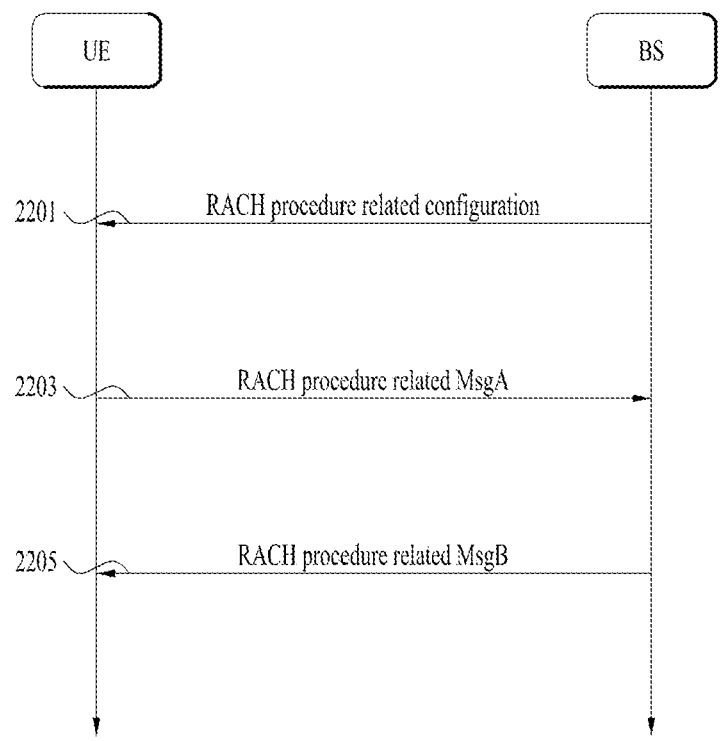
FIG. 22 is a flowchart illustrating one example of UE and BS operations according to various embodiments of the present disclosure.

FIG. 22 is a flowchart illustrating one example of UE and BS operations according to various embodiments of the present disclosure. The content shown in FIG. 22 can be summarized from the viewpoint of UE/BS operations.
UE Procedure In step 2201, the UE may receive (configuration) information related to the RACH procedure from the BS.

For example, the corresponding information may include information related to execution of the RACH procedure and/or configuration information (e.g., configuration related to PUSCH resources (set) considered in Methods 1 to 6 to be described) of MsgA. For example, the corresponding information may further include other information that enables the UE to select/use the 2-step RACH procedure/4-step RACH procedure.

In step 2203, the UE may transmit MsgA based on (configuration) information received from the BS.

For example, the UE may transmit MsgA based on the PUSCH resources (aggregation) to be described in Methods 1 to 6.

For example, assuming that the UE performs the 2-step RACH procedure based on system information (SI), the UE may select preamble(s) from among the corresponding preamble set, and may transmit the selected preamble(s). The UE may transmit data using PUSCH resources related to the corresponding preamble. For example, the corresponding data may include the UE ID and/or information transmitted at Msg3 of the 4-step RACH procedure.

In step 2205, the UE may receive at least one MsgB as a response to MsgA from the BS.

For example, the UE may receive MsgB and/or RAR depending on whether or not the BS fails to decode MsgA. A detailed example thereof will hereinafter be described with reference to Case 1 and Case 1 to be described later.
BS Procedure In step 2201, the BS may transmit or broadcast (configuration) information related to the RACH procedure.

For example, the corresponding information may include information related to execution of the RACH procedure and/or configuration information (e.g., configuration related to PUSCH resources (aggregation) considered in Methods 1 to 6) related to PUSCH (UL resource) of MsgA described in various embodiments of the present disclosure. For example, the corresponding information may further include necessary information for enabling the UE to select/perform the 2-step RACH procedure and the 4-step RACH procedure.

In step 2203, the BS may receive MsgA transmitted based on the corresponding (configuration) information.

For example, the BS may receive data from PUSCH resources (aggregation) (belonging to Methods 1 to 6) based on a timing point and RAPID of the received preamble.

In step 2205, the BS may transmit at least one MsgB as a response to MsgA to the UE.

For example, the BS may be configured to transmit MsgB and/or RAR depending on whether or not the BS fails to decode MsgA. A detailed example thereof will hereinafter be described with reference to Case 1 and Case 2 to be described later.

Detailed operations, functions, and terms for use in the respective operation modes can be performed and described based on various embodiments of the present disclosure.

Various embodiments of the present disclosure will now be described in detail. All or some of the embodiments of the present disclosure may be combined with each other to implement other various embodiments, which can be clearly understood by a person skilled in the art.

3.1. One to Multiple Mapping Rule Between RO and PUSCH

Various embodiments of the present disclosure can provide the mapping method when there are multiple PUSCH resource sets capable of being transmitted to the preambles transmitted in only one RO.

For example, RO sharing may be implemented between the 2-step RACH procedure and the 4-step RACH procedure. For example, a PRACH preamble for the 4-step RACH procedure and a PRACH preamble for the 2-step RACH procedure can be configured/designated separately from each other. For example, in one case where RO sharing is allowed and in the other case where RO sharing is not allowed, the PRACH preamble for the 4-step RACH procedure and the PRACH preamble for the 2-step RACH preamble may be configured/designated separately from each other.

For example, if 64 PRACH preambles are allocated for the contention-based random access procedure, the front 32 PRACH preambles from among the 64 PRACH preambles can be configured/designated as PRACH preambles for the 4-step RACH procedure, and the rear 32 PRACH preambles from among the 64 PRACH preambles can be configured/ designated as PRACH preambles for the 2-step RACH procedure. For example, the corresponding configuration/instruction may be based on 'systeminformationblocktype1 (SIB1)' and/or RACH configuration included in UE-specific RRC signaling.

For example, the PRACH preambles can be understood as code-domain resources, and can be distinguished from each other based on a root index of the preambles. For example, the BS having received the PRACH preamble may determine whether the corresponding PRACH preamble is a PRACH preamble for the 4-step RACH procedure or a PRACH preamble for the 2-step RACH procedure, so that the BS may identify whether the UE having transmitted the PRACH preamble has initiated either the 2-step RACH procedure or the 4-step RACH procedure.

In contrast, for example, when RO sharing is not allowed (RO separation), RO for the 4-step RACH procedure may be distinguished from RO for the 2-step RACH procedure, so that the BS can identify whether the UE having transmitted the PRACH preamble has initiated the 2-step RACH procedure and/or the 4-step RACH procedure based on the corresponding RO.

For example, when RO sharing between the 2-step RACH procedure and the 4-step RACH procedure is allowed, the PRACH preamble for the (contention-based) 2-step RACH procedure from among the remaining PRACH preambles other than PRACH preambles for the 4-step RACH procedure can be configured in RO for (contention-based) 4-step RACH procedure. For example, the purpose of the corresponding PRACH preamble transmission (e.g., 2-step RACH procedure or 4-step RACH procedure) can be identified by the BS. That is, in the above-mentioned example, from among all contention-based preambles, the PRACH preamble for the 2-step RACH procedure from among the remaining PRACH preambles other than PRACH preambles for the 4-step RACH procedure may be configured, the BS may identify whether the PRACH preamble transmitted by the UE based on the corresponding PRACH preamble is for the 2-step RACH procedure or for the 4-step RACH procedure.

For example, PUSCH (or PUSCH occasion) of MsgA (Message A) may be allocated to a PUSCH slot (PUSCH slot following the RACH slot) subsequent to the RACH slot. For example, not only in the case where RO sharing is allowed, but also in the other case where RO sharing is disallowed, PUSCH (or PUSCH occasion) of MsgA (Message A) may be allocated to the PUSCH slot (PUSCH slot following the RACH slot) subsequent to the RACH slot.

For example, when RO sharing is achieved between the 2-step RACH procedure and the 4-step RACH procedure, the preambles for the 2-step RACH procedure may be used as the remaining preambles other than a preamble for others (e.g., SI request), a contention-free preamble, and a preamble configured for the 4-step RACH procedure, from among total available preambles, or may be used as preambles other than some contention-free preambles regardless of the 2-step/4-step RACH procedures. However, in the latter case, the UE may discriminate between the 2-step RACH procedure and the 4-step RACH procedure according to the presence or absence of a PUSCH to be transmitted after transmission of preambles, and may then perform the subsequent operations based on the result of discrimination.

For example, when separate RO for the 2-step RACH procedure is configured, the remaining preambles other than the contention-free preambles from among all preambles can be used. For example, when RO separation is given, RO for the 2-step RACH procedure and RO for the 4-step RACH procedure can be configured separately from each other. When RO separation is not configured, all preambles (64 preambles) can be used for the 2-step RACH procedure.

When the preamble and the PUSCH are transmitted at a specific RO because the UE desires to use the 2-step RACH procedure, various embodiments of the present disclosure can be associated with a method for configuring and transmitting a plurality of PUSCHs related to preamble transmission after completion of such preamble transmission. The reason why the use of several PUSCHs is configured is that there is a high possibility of data collision encountered when the UE transmits data within only one PUSCH resource related to all preambles that are transmitted in one RO and/or multiple ROs.

Various embodiments of the present disclosure may provide a method for establishing different PUSCHs to be transmitted according to the RACH preamble index (e.g., RAPID), allocating a plurality of PUSCH resources to the preambles of the 2-step RACH procedure, or transmitting data to the preambles of the 2-step RACH procedure.

For example, in at least one of the following methods 1 to 6, one example of mapping RO to PUSCH may be as follows.

For example, at least one consecutive preamble index of (valid) PRACH occasions available within a slot can be mapped to (valid) PUSCH occasions according to the following first, second and third methods.

In the first method, one or more consecutive preamble indexes of (valid) PRACH occasions can be mapped to (valid) PUSCH occasions in ascending order of preamble indexes contained in one PRACH occasion.

In the second method, one or more consecutive preamble indexes of (valid) PRACH occasions can be mapped to (valid) PUSCH occasions in ascending order of frequency resource indexes for the frequency-multiplexed PRACH occasions.

In the third method, one or more consecutive preamble indexes of (valid) PRACH occasions within the slot can be mapped to (valid) PUSCH occasions in ascending order of time-resource indexes of the time-multiplexed PRACH occasions within the PRACH slot mapped to (valid) PUSCH occasion.

As described above, one or more consecutive preamble indexes of (valid) PRACH occasions can be mapped to (valid) PUSCH occasion.

First, one or more consecutive preamble indexes of (valid) PRACH occasions may be determined in ascending order of frequency resource indexes for frequency-multiplexed PUSCH resources.

Second, one or more consecutive preamble indexes of (valid) PRACH occasions may be determined in consideration of the ascending order of DMRS indexes within PUSCH occasion. For example, DMRS indexes may be determined in consideration of the ascending order of DMRS port indexes, and may be determined in consideration of the ascending order of DMRS sequence indexes.

Third, one or more consecutive preamble indexes of (valid) PRACH occasions may be determined in consideration of the ascending order of time-resource indexes for time-multiplexed PUSCH occasions within the PUSCH slot.

Fourth, one or more consecutive preamble indexes of (valid) PRACH occasions may be determined in consideration of the ascending order of indexes of PUSCH slots.

Figure 23:
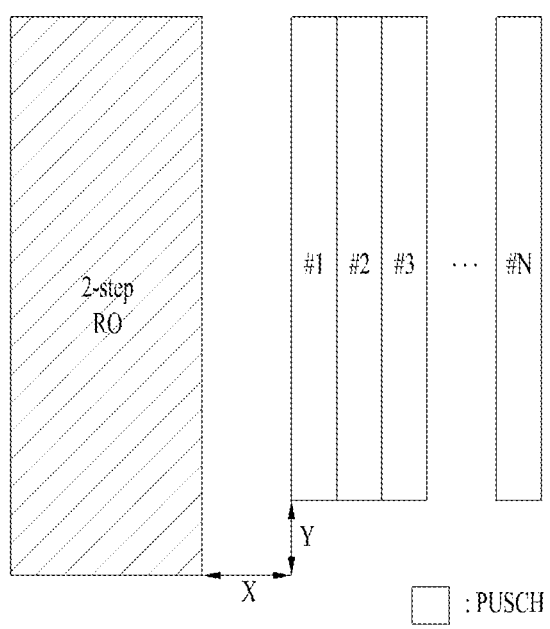
FIG. 23 is a diagram illustrating one example of the mapping scheme between RO and PUSCH according to various embodiments of the present disclosure.

3.1.1. Method 1: One PUSCH Resource (Time/Frequency Resource, T/F Resource) Per RAPID Allocation Scheme FIG. 23 is a diagram illustrating one example of the mapping scheme between RO and PUSCH according to various embodiments of the present disclosure. For example, FIG. 23 illustrates one example of one-to-one mapping (TDM) between RAPID and PUSCH. For example, several PUSCH occasions may be TDM-processed.

For example, the corresponding scheme may be designed in a manner that the respective PUSCH resources (or occasions) in association with the number of preambles (e.g., N preambles, where N is an integer (or natural number) equal to or greater than zero '0') for the 2-step RACH procedure can be configured as shown in FIG. 23. For example, PUSCH #n (1, 2, 3, . . . , N) may refer to a PUSCH occasion (resource) related to RAPID #n.

For example, PUSCH resources for each RO (and/or RAPID) for N 2-step RACH procedures may be configured, so that a total of N PUSCH resources can be configured.

For example, in the process of mapping between RO (or RAPID) and PUSCH, time-multiplexed PUSCH resources (occasions) in the time domain may be arranged in ascending order thereof.

For example, T/F starting positions of PUSCH of RAPID #1 may be configured through system information (SI). For example, offset values of 'x' and 'y' may be configured through system information (SI). For example, 'x' may denote an offset value in the time region or the time domain. For example, 'y' may denote an offset value in the frequency region or the frequency domain.

For example, the criterion of the corresponding offset value may be configured based on either the last symbol of RO and/or the start SC/SB of RO. For example, the offset value 'x' may be set to at least one of symbols/slots/subframes. For example, the offset value 'y' may be set to at least one of SC/RB units. For example, according to various embodiments of the present disclosure, the offset value 'x' and/or the offset value 'y' can be applied based on the starting SC/RB. For example, when the offset value 'y' is given on an RB basis, the corresponding offset value 'y' can be applied in the same manner as 'y RBs' from the start boundary (or end boundary) on the frequency axis of the starting RB. That is, for example, the starting SC/RB may be used as a reference point for offset application.

For example, when using the above-mentioned scheme, total frequency resources are used as only one PUSCH occasion (i.e., frequency resources of the respective PUSCH occasions are identical to each other from the viewpoint of frequency resources), ICI (inter carrier interference) reduction may be less than those of a frequency division multiplexing (FDM) format shown in the following method 3. However, since the time duration is relatively shortened, a cell coverage may also be reduced.

3.1.1.1 Option 1-1: RAPID to Multiple PUSCH Allocation

Figure 24:
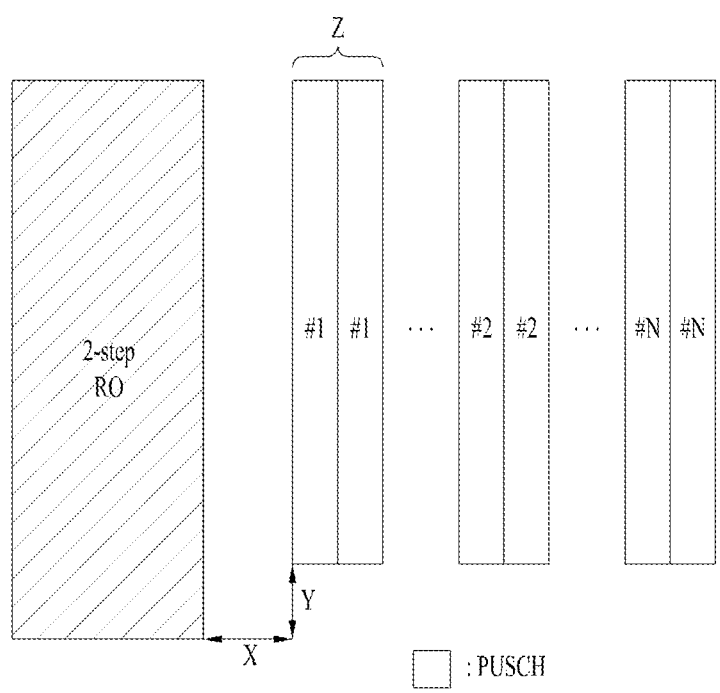
FIG. 24 is a diagram illustrating one example of the mapping scheme between RO and PUSCH according to various embodiments of the present disclosure.

FIG. 24 is a diagram illustrating one example of the mapping scheme between RO and PUSCH according to various embodiments of the present disclosure. For example, FIG. 24 illustrates one example of the RAPID to multiple PUSCH (TDM) scheme.

For example, when TDM processing is performed, data is transmitted for a short period of time, so that the cell coverage may be small in size. In addition, when the one-to-one mapping scheme is used and the same RAPID is selected (by multiple UEs), PUSCHs may collide with each other.

In case of Option 1-1, for example, a predetermined number of PUSCHs (Z PUSCHs, where Z is an integer (or natural number) equal to or greater than '0') related to one RAPID can be configured as multiple PUSCH resource sets mapped to one RAPID as shown in FIG. 24. For example PUSCH #n (1, 2, 3, . . . , N) may refer to PUSCH occasions (resources) related to RAPID #n. For example, one RO (and/or RAPID) for the 2-step RACH procedure may be associated with Z PUSCH occasions.

For example, the UE transmits the same data to multiple PUSCH sets, so that the cell coverage may increase. Alternatively, any one of the PUSCH resource sets is selected in consideration of collision between UEs, and data is then transmitted using the selected PUSCH resource aggregation.

For example, the number of PUSCH resource sets configured in one RAPID can also be transmitted along with configuration information related to RACH.

3.1.1.2 Option 1-2: Multiple RAPID to One PUSCH Resource Allocation

For example, when one or more PUSCHs are allocated to one RAPID (or one RO) and there is a small number of UEs scheduled to transmit the RACH, unnecessary time/frequency (T/F) resources should be mandatorily guaranteed, so that this situation may be considered inefficient in terms of resource utilization.

In case of Option 1-2, for example, the entire RAPID for the 2-step RACH procedure is divided into M groups (where M is a natural number), so that data can be transmitted to M consecutive PUSCH resources.

For example, each of the remaining groups other than the last group may have $$\left\lfloor \frac{N}{M} \right\rfloor$$

(floor (N/M), floor function) preamble indexes (or RAPIDs), the last group may be configured to have $$\left\lfloor \frac{N}{M} \right\rfloor + \left(N - M * \left\lfloor \frac{N}{M} \right\rfloor\right)$$

RAPIDs, and/or grouping may be configured in a manner that one RAPID is sequentially retrieved from the first to last groups. In the latter example, assuming that a total of N preambles is seven preambles and divided into 3 groups, the first group includes three preambles, the second group includes two preambles, and the third group includes two preambles, and the preambles of the respective groups may have the same PUSCH resources.

For example, the UE may transmit a PUSCH using PUSCH resources corresponding to the group to which a UE-selected RAPID belongs.

3.1.1.3 Option 1-3: Multiple RAPID to Multiple PUSCH Resource Allocation

In case of Option 1-3, in order to prevent extension of the cell coverage or collision between UEs as described in Option 1-1, Option 1-3 can be implemented by applying the plurality of PUSCH resource sets to Option 1-2.

For example, PUSCH transmission may be performed for each group. In this case, PUSCH retransmission can be performed by referring to the number of multiple PUSCH resource sets transmitted through the system information (SI).

In case of Option 1-3, whereas the amount of time/frequency resources to be used can increase, the possibility of collision between the UEs may decrease, resulting in coverage enhancement.

3.1.2. Method 2: TDM/CDM Allocation Scheme

For example, since PUSCH of MsgA is transmitted without reception of information (grant) related to PUSCH transmission from the network in a different way from Msg3, the PUSCH of MsgA may be more sensitive to such collision.

In Option 1, when two UEs transmit data using the same RAPID, data transmission is performed in one PUSCH resource, so that collision between the UEs may occur.

For example, in terms of power, since the 2-step RACH procedure is designed in a manner that preambles and data are transmitted before feedback signals are received from the network, power consumption related to retransmission may become more serious than the 4-step RACH procedure.

Therefore, there is needed a method for reducing the probability of collision between UEs (between PUSCHs). In Method 2, multiple scrambling codes required to generate DM-RS and PUSCH may be configured, and a plurality of UEs for one PUSCH resource may be supported, so that each of the UEs can be distinguished from the scrambling sequence and/or DM-RS sequences.

For example, the plurality of UEs for one PUSCH resource can be multiplexed using the scrambling sequence and/or DM-RS sequences.

For example, the number of UEs (P UEs, where P is an integer (or natural number) equal to or greater than '0') in which data transmission within one PUSCH resource is allowed may be configured along with RACH configuration.

Method 2 according to various embodiments of the present disclosure may be applied separately, and/or may be combined with at least one of contents described in Method 1 and/or at least one of lower (or low-rank) options of Method 1.

3.1.3. Method 3: FDM Allocation Scheme

Figure 25:
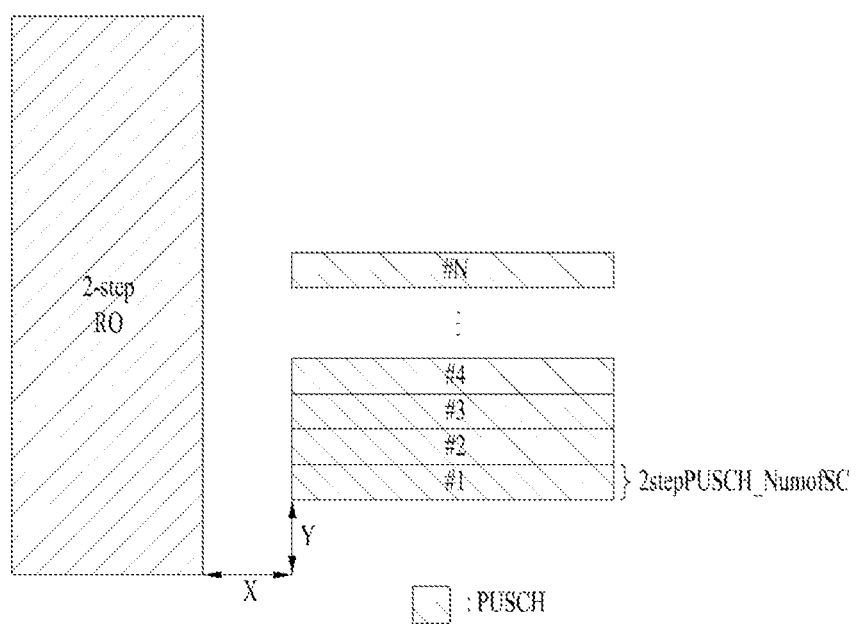
FIG. 25 is a diagram illustrating one example of the mapping scheme between RO and PUSCH according to various embodiments of the present disclosure.

FIG. 25 is a diagram illustrating one example of the mapping scheme between RO and PUSCH according to various embodiments of the present disclosure. For example, FIG. 25 illustrates one example of the one-to-one mapping method (FDM) between RAPID and PUSCH. For example, a plurality of PUSCH occasions may be FDM-processed.

In Method 3, for a predetermined number of preambles (N preambles) for the 2-step RACH procedure, each of the PUSCH resources may be configured in a FDM format as shown in FIG. 25. For example, USCH #n (1, 2, 3, . . . , N) may refer to PUSCH occasions (resources) related to RAPID #n.

For example, PUSCH resources for each RO (and/or RAPID) for N 2-step RACH procedures may be configured, so that a total of N PUSCH resources can be configured.

For example, in the method of mapping between RO (or RAPID) and PUSCH, PUSCH resources (occasions) are frequency-multiplexed in the frequency domain can be used in ascending order thereof.

For example, the offset value may be configured in a similar way to Method 1. For example, T/F starting position of the PUSCH of RAPID #1 may be configured through system information (SI). For example, the offset values 'x' and 'y' may be configured through system information (SI). For example, 'x' may denote an offset value in the time region or the time domain. For example, 'y' may denote an offset value in the frequency region or the frequency domain.

For example, the criterion of the corresponding offset value may be configured based on either the last symbol of RO and/or the start SC/SB of RO. For example, the offset value 'x' may be set to at least one of symbols/slots/subframes. For example, the offset value 'y' may be set to at least one of SC/RB units.

Meanwhile, for example, during transmission of RB-based PUSCH, when the number of preambles (i.e., N value) is at a high value (e.g., when the number of preambles is equal to or higher than a threshold value related to an initial active BWP), the PUSCH frequency resources may exceed the initial active BWP. Thus, for example, in association with PUSCH transmission of at least MsgA, the BS may configure SC-based PUSCH transmission rather than RB-based PUSCH transmission. For example, the BS may designate the corresponding value (2stepPUSCH_NumofSC) through system information (SI). For example, the UE may calculate (or acquire) time/frequency (T/F) resources based on the corresponding value, a maximum data size value, and a minimum MCS value, and can apply the calculated (or acquired) T/F resources to PUSCH transmission related to UE-selected RAPID.

For example, when data is transmitted according to the above-mentioned scheme, a relatively long time is required for data transmission in a different way from Method 1, so that this situation may be beneficial to cell coverage efficiency. However, in relation to data (PUSCH) transmission from another UE at a contiguous frequency, ICI may occur.

For example, when using the above-mentioned scheme, at least one of options (1-1, 1-2, 1-3, etc.) applied to Method 1 (TDM) may be applied in the same or similar manner. For example, in order to acquire a frequency diversity gain and/or to implement reduction in collision through a resource overlapping configuration, at least one of a one-RAPID-to-multiple-PUSCH scheme may be applied/used, a method for allocating multiple RAPIDs to one PUSCH to efficiently use such resources, and/or a multiple-RAPID-to-multiple-PUSCH scheme designed to consider two methods can be applied/used in the same or similar manner as described above.

3.1.4. Method 4: FDM/CDM Allocation Method

In Method 4, the same or similar content as in Method 2 can be CDM-applied to Method 3 implemented in FDM format.

For example, multiple UE transmission may be allowed in each PUSCH being transmitted in FDM format. By distinction between the corresponding DM-RS location and/or the scrambling sequence, the multiples UEs can be distinguished from each other.

For example, the above-mentioned scheme may have advantages in FDM, may distinguish multiple UEs from each other using a code division region, so that the probability of collision between UEs can be reduced.

3.1.5. Method 5: FDM/TDM Allocation Scheme

For example, in Method 3, when PUSCH transmission is performed on RB basis but not on SC basis, all preambles for the 2-step RACH preamble may not always be supported. In addition, for example, FDM may be vulnerable to ICI, TDM may be vulnerable to ISI (Inter Symbol Interference), and the cell coverage may be small in size. Due to these disadvantages, Method 5 may be used to perform PUSCH transmission in the form of a combination of FDM and TDM.

Figure 26:
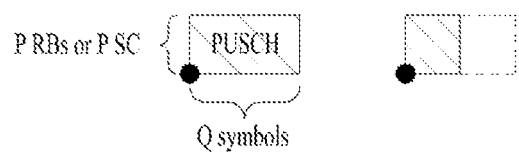
FIG. 26 is a diagram illustrating one example of a PUSCH resource set according to various embodiments of the present disclosure.

FIG. 26 is a diagram illustrating one example of a PUSCH resource set according to various embodiments of the present disclosure.

Referring to FIG. 26, the PUSCH resource set (which is the most basic unit for transmitting PUSCH of MsgA) according to various embodiments of the present disclosure can be defined as time/frequency (T/F) resources as shown in FIG. 26. For example, the PUSCH resource set may include Q symbols (where Q is an integer (or natural number) equal to or higher than '0') in the time domain, and may include P RBs or P SCs (where P is an integer (or natural number) equal to or higher than '0') in the frequency domain. For example, the PUSCH resource set shown in FIG. 26 may be used for FDM/TDM allocation.

For example, based on the corresponding definition, the corresponding PUSCH resource set may be time/frequency resources determined according to the largest data size and the smallest MCS index that are transmitted on PUSCH of the 2-step RACH procedure.

For example, if the modulation order is changed, the UE may configure resources required to perform data transmission based on the initial starting symbol, SC or RB, and may transmit the configured resources, as shown in FIG. 25.

For example, the PUSCH resource set acting as the PUSCH transmission unit may be configured based on the smallest MCS value and the largest data size. For example, the PUSCH resource set may be set to a fixed value.

Figure 27:
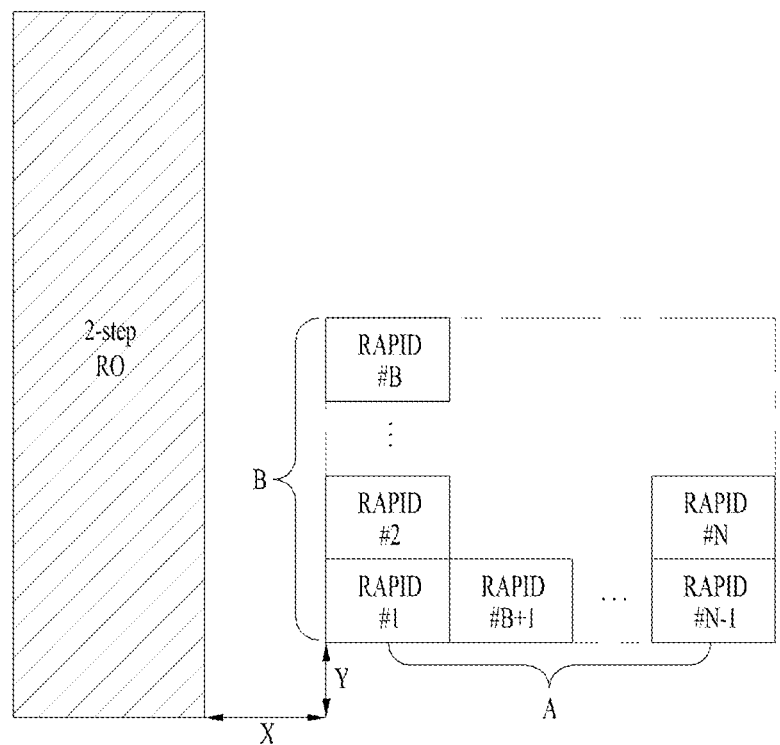
FIG. 27 is a diagram illustrating one example of the mapping scheme between RO and PUSCH according to various embodiments of the present disclosure.

FIG. 27 is a diagram illustrating one example of the mapping scheme between RO and PUSCH according to various embodiments of the present disclosure. For example, FIG. 27 illustrates one example of TDM/FDM-based PUSCH resource configuration.

For example, the corresponding scheme may be configured in a manner that each of the PUSCH resources (or occasions) related to the number of preambles (e.g., N preambles, where N is an integer (or natural number) equal to or greater than '0') for the 2-step RACH procedure is configured as shown in FIG. 27. For example, PUSCH where RAPID #n (1, 2, 3, . . . , N) is indicated may refer to PUSCH occasions (resources) related to RAPID #n.

For example, per-RO (and/or per-RAPID) PUSCH resource N 2-step RACH procedures may be configured, so that a total of N PUSCH resources can be configured.

Referring to FIG. 27, the BS may simultaneously transmit not only the number of FDMs (B FDMs, where B is an integer (or natural number) equal to or greater than '0') for use in the frequency domain (B FDMs), but also the number of TDMs (A TDMs, where A is an integer (or natural number) equal to or greater than '0') for use in the time domain through RACH configuration information. For example, preambles (or the number of preambles) for the 2-step RACH procedure may be sequentially (e.g., in ascending or descending numerical order) one-to-one mapped to preamble indexes with priority over frequency and/or time.

For example, in the RO (or RAPID) to PUSCH mapping scheme, PUSCH resources (occasions) frequency-multiplexed in the frequency domain may be used in ascending order thereof, and PUSCH resources (occasions) time-multiplexed in the time domain may be used in ascending order thereof.

For example, the offset value may be configured in a similar way to Method 1. For example, T/F starting positions of PUSCH of RAPID31 may be configured through system information (SI). For example, the offset values 'x' and 'y' may be configured through system information (SI). For example, 'x' may denote an offset value in the time region or the time domain. For example, 'y' may denote an offset value in the frequency region or the frequency domain.

For example, the criterion of the corresponding offset value may be configured based on either the last symbol of RO and/or the start SC/SB of RO. For example, the offset value 'x' may be set to at least one of symbols/slots/subframes. For example, the offset value 'y' may be set to at least one of SC/RB units.

3.1.5.1. Option 5-1: RAPID to Multiple PUSCH Allocation

Figure 28:
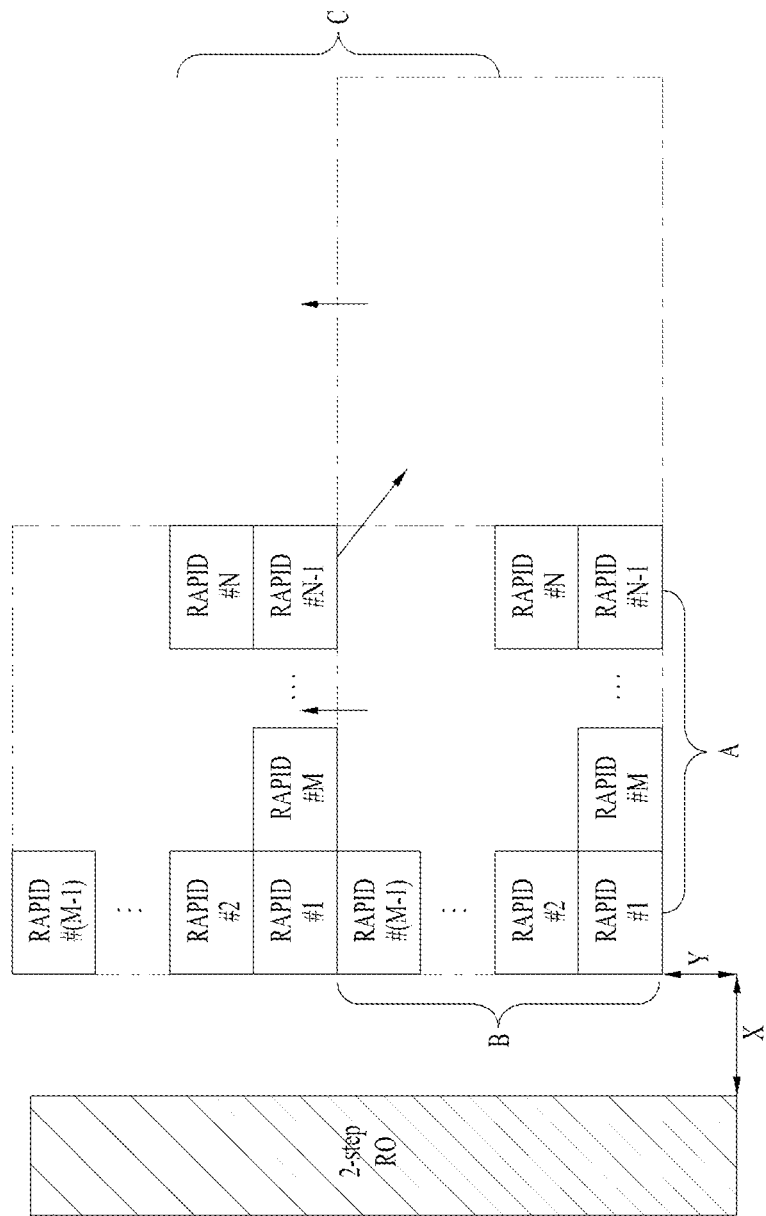
FIG. 28 is a diagram illustrating one example of the mapping scheme between RO and PUSCH according to various embodiments of the present disclosure.

FIG. 28 is a diagram illustrating one example of the mapping scheme between RO and PUSCH according to various embodiments of the present disclosure. For example, FIG. 28 illustrates one example of TDM/FDM-based PUSCH resource configuration.

For example, the corresponding scheme may be configured in a manner that each of the PUSCH resources (or occasions) related to the number of preambles (e.g., N preambles, where N is an integer (or natural number) equal to or greater than '0') for the 2-step RACH procedure is configured as shown in FIG. 28. For example, PUSCH where RAPID #n (1, 2, 3, . . . , N) is indicated may refer to PUSCH occasions (resources) related to RAPID #n.

In Option 5-1, for example, when there are extra resources to be used to acquire the cell coverage and/or the frequency diversity, the group of the above-mentioned entire PUSCH resource sets can be configured in an overlapping manner within the time and/or frequency domain.

Assuming that quadrants comprised of X-axis dotted lines corresponding to the time domain and Y-axis dotted lines corresponding to the frequency domain are provided as shown in FIG. 28, PUSCH resource set group configurations of the third quadrant may be repeatedly-overlap configured in each of the second quadrant, the fourth quadrant, and the first quadrant.

For example, assuming that a maximum number (O) of overlap configurations (O configurations, where O is an integer (or natural number) equal to or greater than '0') is given or defined/configured, the entire PUSCH resource group may be repeatedly/overlap-configured in consideration of the initial active BWP, or may be copied and extended in the frequency/time domains (a maximum number of times: zero times) in consideration of the initial active BWP as shown in the example of FIG. 27.

For example, the RAPID between total copied groups may be equal to or different from its own original location. That is, RAPIDs corresponding to PUSCH occasions included in the respective total copied groups may be identical to or different from each other.

Referring to FIG. 28, when the PUSCH resource set is duplicated twice in the form of FDM, the original (PRACH/RAPID) index may be allocated to the PUSCH resource set (or copied/repeated/duplicated). And/or, RAPID #1 in the copied PUSCH resource set group may be mapped to PUSCH resources corresponding to RAPID #2 of the original PUSCH resource group. And/or, RAPID #2 in the copied PUSCH resource set group may be mapped to PUSCH resources corresponding to RAPID #2 of the original PUSCH resource set group. And/or, RAPID #2 in the copied PUSCH resource set group may be successively transmitted to be mapped to PUSCH resources corresponding to RAPID #4 of the original PUSCH resource set group.

3.1.5.2. Option 5-2: Multiple RAPID to One PUSCH Resource Allocation

In Option 5-2, a plurality of preambles may be allocated to one PUSCH resource set due to the same reason as described in Option 1-2.

Referring to FIG. 28, total time/frequency resources of the PUSCH resource set group may be changed according to the number of preambles related to each set. For example, as the number of preambles related to each set increases, total time/frequency resources of the PUSCH resource set group may decrease.

For example, in the corresponding scheme, if a total of preambles for the 2-step RACH procedure in only one RO is divided into K groups (where K is a natural number), each group may be allocated to K PUSCH resources. For example, a method for allocating K PUSCH resources and/or a method for indexing K PUSCH resources may be identical or similar to the method for allocating a total of N preambles described in Method 5.

That is, the BS may add a maximum number of FDMs, a maximum number of TDMs, and/or a maximum number of groups (K groups) to configuration of the 2-step RACH procedure, and may transmit the added result. As a result, the UE may calculate (acquire) PUSCH resources for each RAPID, and may transmit PUSCH based on the calculated (acquired) PUSCH resources.

3.1.6. Method 6: FDM/TDM/CDM Allocation Scheme

In Method 6, for the same reason as in Method 2, CDM may be combined with Method 5 corresponding to a combination of FDM and TDM, so that data transmission can be performed based on the CDM combination result.

For example, data transmission of multiple UEs may be allowed in each PUSCH being transmitted in FDM/TDM format, and the multiple UEs can be distinguished from each other according to the corresponding DM-RS location and/or distinction between the scrambling sequences.

For example, in the corresponding scheme, advantages and disadvantages of the FDM/TDM concepts can be supplemented with each other, and multiple UEs can be distinguished from each other using the code division region, resulting in reduction in the probability of collision between UEs.

3.2 Subsequent Operation when Preamble Index-to-PUSCH Resource Mapping Corresponds to One-to-Multiple Mapping From among options according to various embodiments of the present disclosure, one option for increasing the frequency diversity/cell coverage or allocating duplicated PUSCH resources in time/frequency domains to prevent collision between the UEs has existed. Here, for example, the UEs may transmit all data related to multiple PUSCHs or a portion of data related to multiple PUSCHs according to the respective UE purposes.

Various embodiments of the present disclosure may provide UE/BS subsequent operations to be performed after transmission of the multiple PUSCHs. For example, the UE/BS subsequent operations may be respectively provided to the following cases.

3.2.1. Case 1: Case in which BS Detects the Preamble Index while Simultaneously Succeeding in all or Some of Data Decoding Through Multiple PUSCH Resources Linked to the Corresponding Preamble Index For example, the BS may transmit multiple MsgBs corresponding to all of the PUDSCH resource sets having succeeded in decoding, may indicate the corresponding PUSCH resource information/indexes through a PDSCH (that carries MsgB payload and/or MsgB) and/or a PDCCH scheduling MsgB, or may transmit only one MsgB through the same PDSCH or the same PDCCH.

For example, in the former case in which information about the success or failure of multiple PUSCHs and indexing information are included in MsgB and then transmitted, the UE may select only one of all multiple PUSCH resource sets to reduce the probability of PUSCH collision, and may transmit the selected PUSCH resource set.

That is, for the number of multiple PUSCHs (K PUSCHs, where K is an integer (or natural number) equal to or greater than '0'), the BS may transmit MsgB K times at intervals of a specific time offset, and the UE may receive MsgB a maximum of K times and then retransmit MsgB a maximum of K times.

For example, the latter case may correspond to one case where the UE transmits the same PUSCH to the PUSCH resource set that is repeatedly configured. Unlike the above-mentioned content, the corresponding case may be configured in a manner that MsgB is transmitted only once, the UE detects MsgB only once and then decides to retransmit MsgB in a situation where UE-ID does not exist.

3.2.2. Cast 2: Whereas BS Detects the Preamble Index, the BS Fails in Data Decoding Through Multiple PUSCH Resources Linked to the Corresponding Preamble Index For example, the BS transmits the RAR to one or more PUSCH resources having failed in decoding (corresponding to the same RAPID), so that the BS may indicate the corresponding PUSCH resource information/index through RAR payload and/or MAC (sub) header.

For example, during transmission of only one PUSCH resource, the UE may automatically recognize that all PUSCHs transmitted several times by the UE have failed. For example, when the BS fails to decode one or more PUSCH resources (or PUSCH received from one or more PUSCH resources) received from the respective UEs (after successfully decoding the preambles), the BS may multiplex a fallback RAR for each of the UEs corresponding to PUSCHs (resources) having failed in data decoding, may acquire/generate only one RAR, and may transmit the acquired/generated RAR to UEs. For example, the UE having received only one RAR can recognize that the BS has failed to decode the PUSCH that has been transmitted from the UE.

For example, the UE may perform the 4-step RAR reception process (fallback operation) based on the operation of confirming whether PUSCH resource information/indexes indicated through RAR (payload and/or (sub) header) are identical to information transmitted by the UE.

Since examples of the above-described proposal method may also be included in one of implementation methods of the various embodiments of the present disclosure, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

Figure 29:
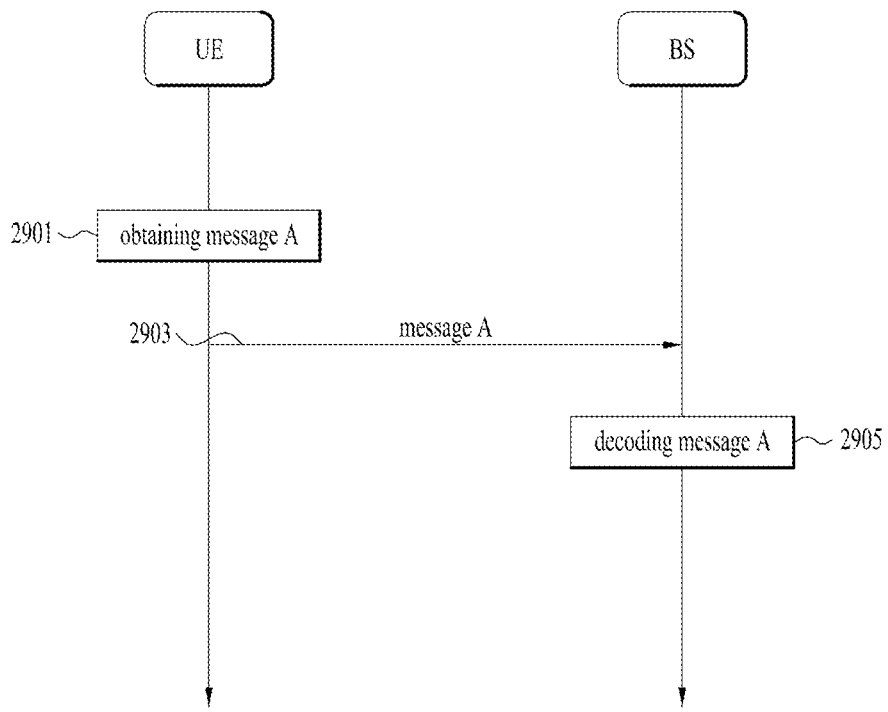
FIG. 29 is a flowchart illustrating UE and BS operations according to various embodiments of the present disclosure.

FIG. 29 is a flowchart illustrating UE and BS operations according to various embodiments of the present disclosure.

Figure 30:
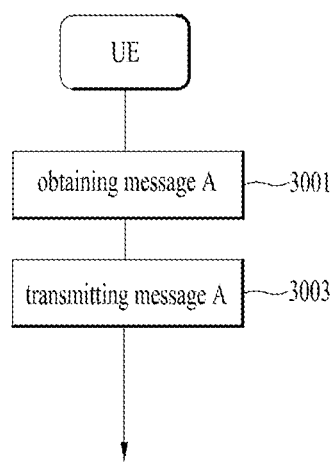
FIG. 30 is a flowchart illustrating a method for operating the UE according to various embodiments of the present disclosure.

FIG. 30 is a flowchart illustrating a method for operating the UE according to various embodiments of the present disclosure.

Figure 31:
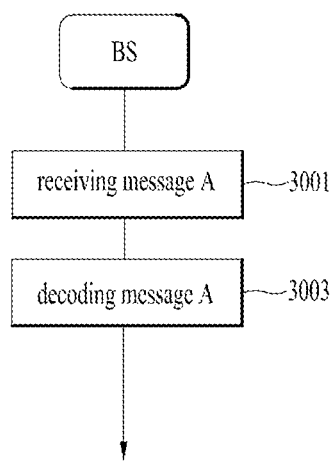
FIG. 31 is a flowchart illustrating a method for operating the BS according to various embodiments of the present disclosure.

FIG. 31 is a flowchart illustrating a method for operating the BS according to various embodiments of the present disclosure.

Referring to FIGS. 29 to 31, in steps 2901 and 3001, the UE may acquire MsgA (Message A) including a PRACH (physical random access channel) preamble and a PUSCH.

In steps 2903, 3003, and 3103, the UE may transmit MsgA (Message A), and the BS may receive MsgA from the UE.

In steps 2905 and 3105, the BS may acquire the PRACH preamble and the PUSCH based on MsgA (Message A) (e.g., by decoding MsgA).

In one embodiment, the PUSCH may be transmitted and received at one or more PUSCH occasions from among consecutive PUSCH occasions within the frequency domain and the time domain.

In one embodiment, the PRACH preamble may be acquired from one or more PRACH preambles that have been predetermined.

In one embodiment, indexes of one or more PRACH preambles may be mapped in ascending order of one or more PUSCH occasions.

Detailed operations of BS and/or UE according to various embodiments of the present disclosure can be described and performed based on the contents of the first to third paragraphs described above.

Since examples of the above-described proposal method may also be included in one of implementation methods of the various embodiments of the present disclosure, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various Embodiments of the Present Disclosure 4.1. Exemplary Configurations of Devices to which Various Embodiments of the Present Disclosure are Applied FIG. 32 is a diagram illustrating devices that implement various embodiments of the present disclosure.

Figure 32:
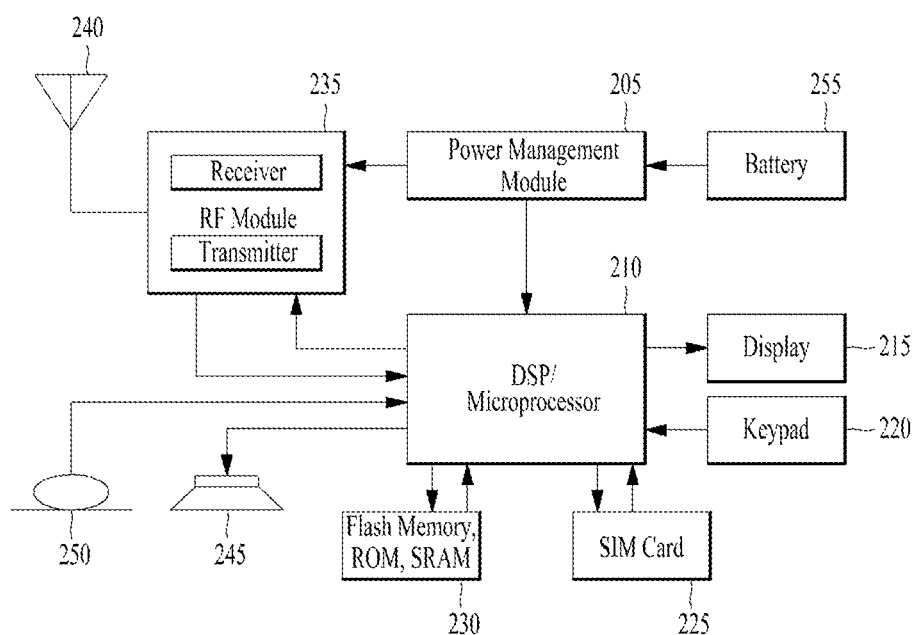
FIG. 32 is a block diagram illustrating an apparatus for implementing various embodiments of the present disclosure.

The devices illustrated in FIG. 32 may be a UE and/or a BS (e.g., eNB or gNB) adapted to perform the afore-described mechanisms, or any devices performing the same operation.

Referring to FIG. 32, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 32 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 32 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor included in a UE (or a communication device included in the UE) and a BE (or a communication device included in the BS) according to various embodiments of the present disclosure may operate as follows, while controlling a memory.

According to various embodiments of the present disclosure, a UE or a BS may include at least one transceiver, at least one memory, and at least one processor coupled to the at least one transceiver and the at least one memory. The at least one memory may store instructions causing the at least one processor to perform the following operations.

A communication device included in the UE or the BS may be configured to include the at least one processor and the at least one memory. The communication device may be configured to include the at least one transceiver, or may be configured not to include the at least one transceiver but to be connected to the at least one transceiver.

In accordance with various embodiments of the present disclosure, one or more processors (or one or more processors of the communication device included in the UE) included in the UE may acquire MsgA (Message A) including a PRACH (physical random access channel) preamble and a PUSCH.

In accordance with various embodiments of the present disclosure, one or more processors included in the UE may transmit MsgA (Message A).

In accordance with various embodiments of the present disclosure, one or more processors (or one or more processors of the communication device included in the BS) may receive MsgA (Message A).

In accordance with various embodiments of the present disclosure, one or more processors may acquire the PRACH preamble and the PUSCH based on MsgA (Message A).

In one embodiment, the PUSCH may be transmitted and received at one or more PUSCH occasions from among consecutive PUSCH occasions within the frequency domain and the time domain.

In one embodiment, the PRACH preamble may be acquired from one or more PRACH preambles that have been predetermined.

In one embodiment, indexes of one or more PRACH preambles may be mapped in ascending order of one or more PUSCH occasions.

A more specific operation of a processor included in a BS and/or a UE according to various embodiments of the present disclosure may be described and performed based on the afore-described clause 1 to clause 3.

Unless contradicting with each other, various embodiments of the present disclosure may be implemented in combination. For example, the BS and/or the UE according to various embodiments of the present disclosure may perform operations in combination of the embodiments of the afore-described clause 1 to clause 3, unless contradicting with each other.

4.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 33:
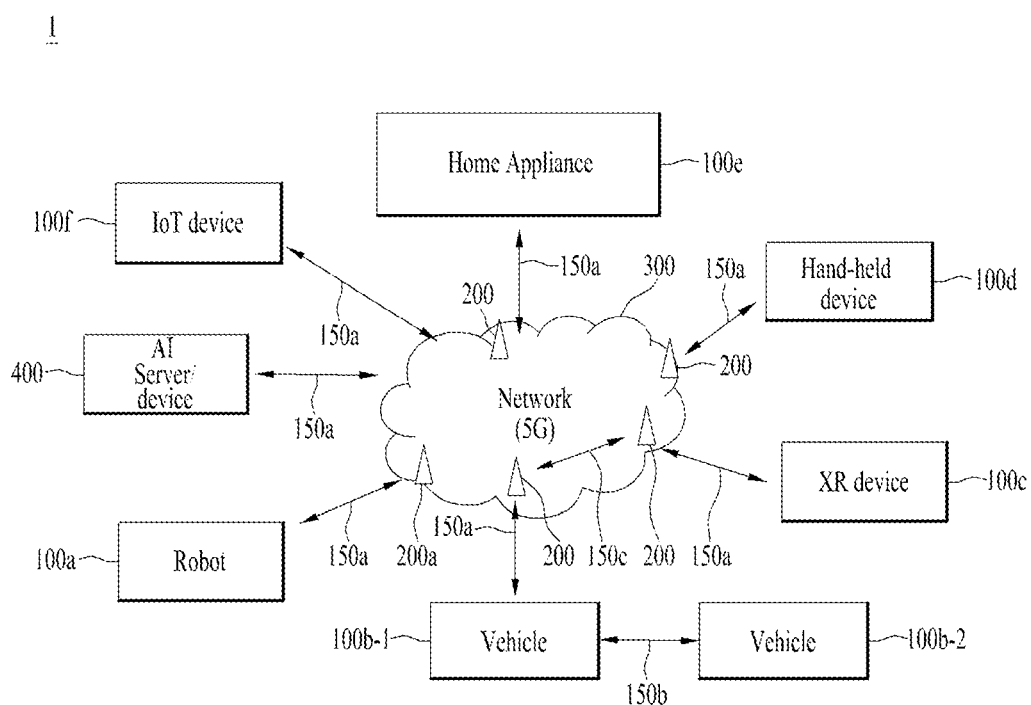
FIG. 33 is a diagram illustrating a communication system to which various embodiments of the present disclosure are applicable.

FIG. 33 illustrates an exemplary communication system to which various embodiments of the present disclosure are applied.

Referring to FIG. 33, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 34:
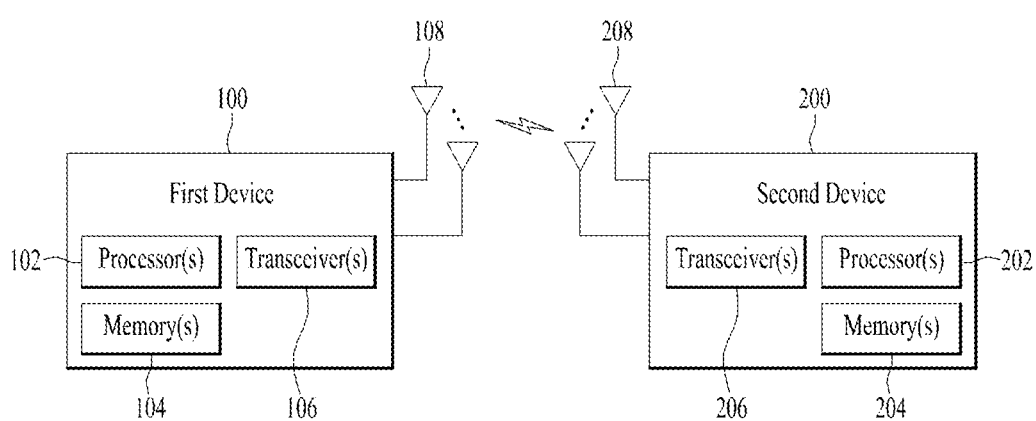
FIG. 34 is a block diagram illustrating wireless devices to which various embodiments of the present disclosure are applicable.

4.2.1 Example of Wireless Devices to which Various Embodiments of the Present Disclosure are Applied FIG. 34 illustrates exemplary wireless devices to which various embodiments of the present disclosure are applicable.

Referring to FIG. 34, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 35:
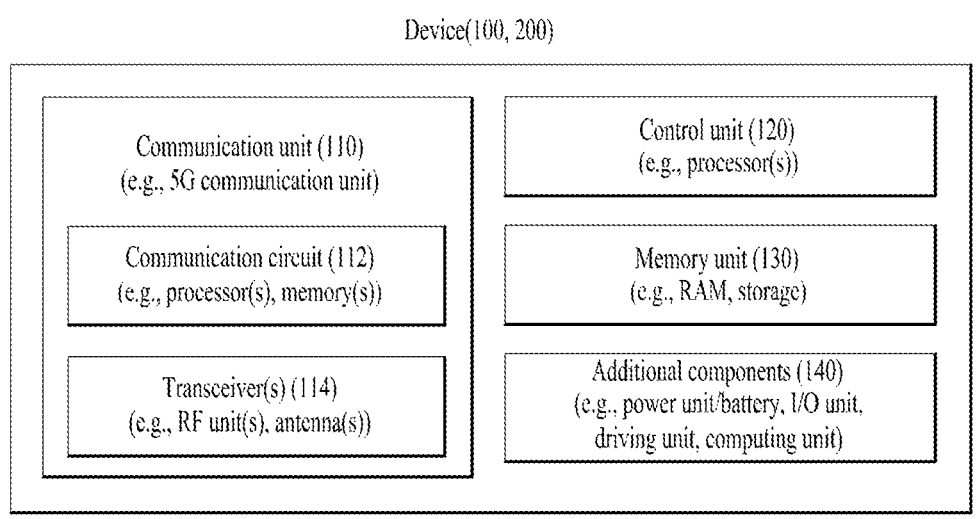
FIG. 35 is a block diagram illustrating another example of wireless devices to which various embodiments of the present disclosure are applicable.

4.2.2. Example of Using Wireless Devices to which Various Embodiments of the Present Disclosure are Applied FIG. 35 illustrates other exemplary wireless devices to which various embodiments of the present disclosure are applied. The wireless devices may be implemented in various forms according to a use case/service (see FIG. 33).

Referring to FIG. 35, wireless devices 100 and 200 may correspond to the wireless devices 100 and 200 of FIG. 33 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 33. For example, the transceiver(s) 114 may include the one or more transceivers 106 and 206 and/or the one or more antennas 108 and 208 of FIG. 33. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 35, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 35 will be described in detail with reference to the drawings.

Figure 36:
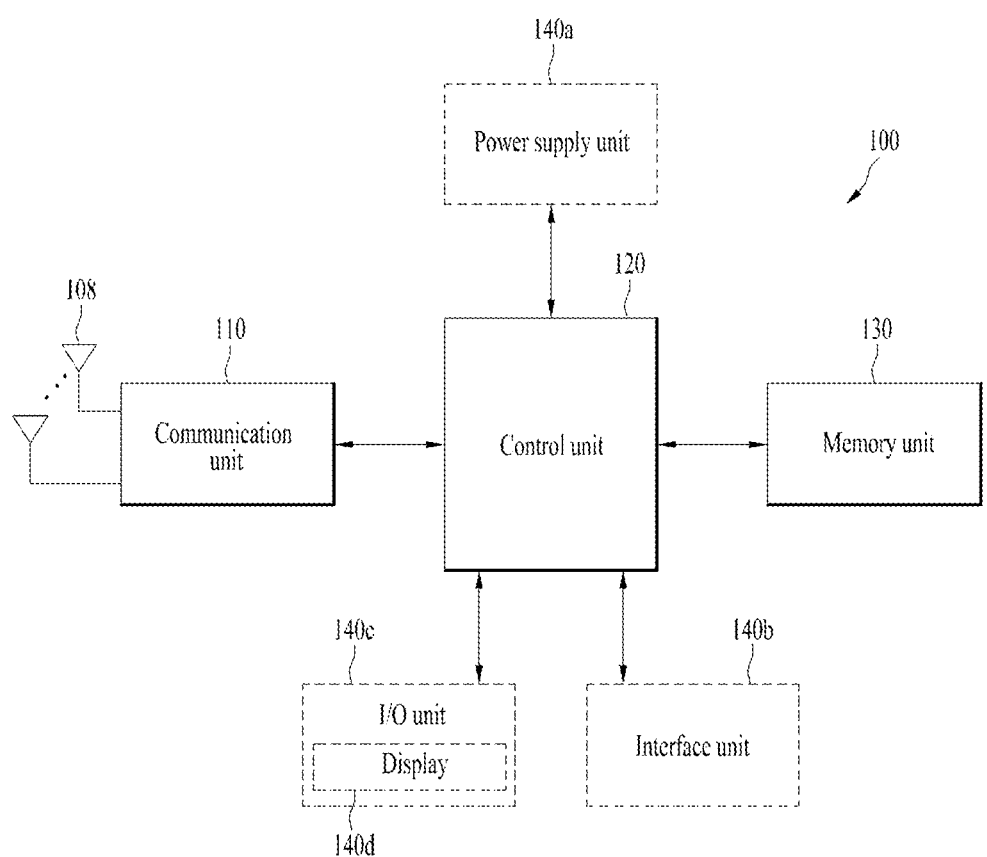
FIG. 36 is a block diagram illustrating a portable device applied to various embodiments of the present disclosure.
Figure 37:
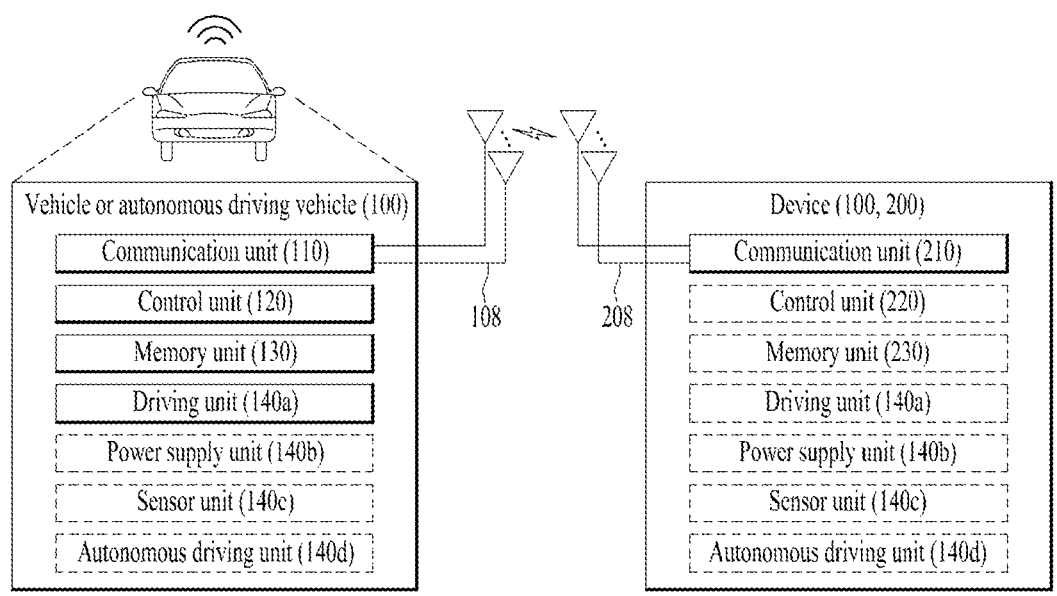
FIG. 37 is a block diagram illustrating a vehicle or an autonomous driving vehicle, which is applied to various embodiments of the present disclosure.

4.2.3. Example of Portable Device to which Various Embodiments of the Present Disclosure are Applied FIG. 36 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 36, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

4.2.4. Example of Vehicle or Autonomous Driving Vehicle to which Various Embodiments of the Present Disclosure.

FIG. 39 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 39, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 34, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 38:
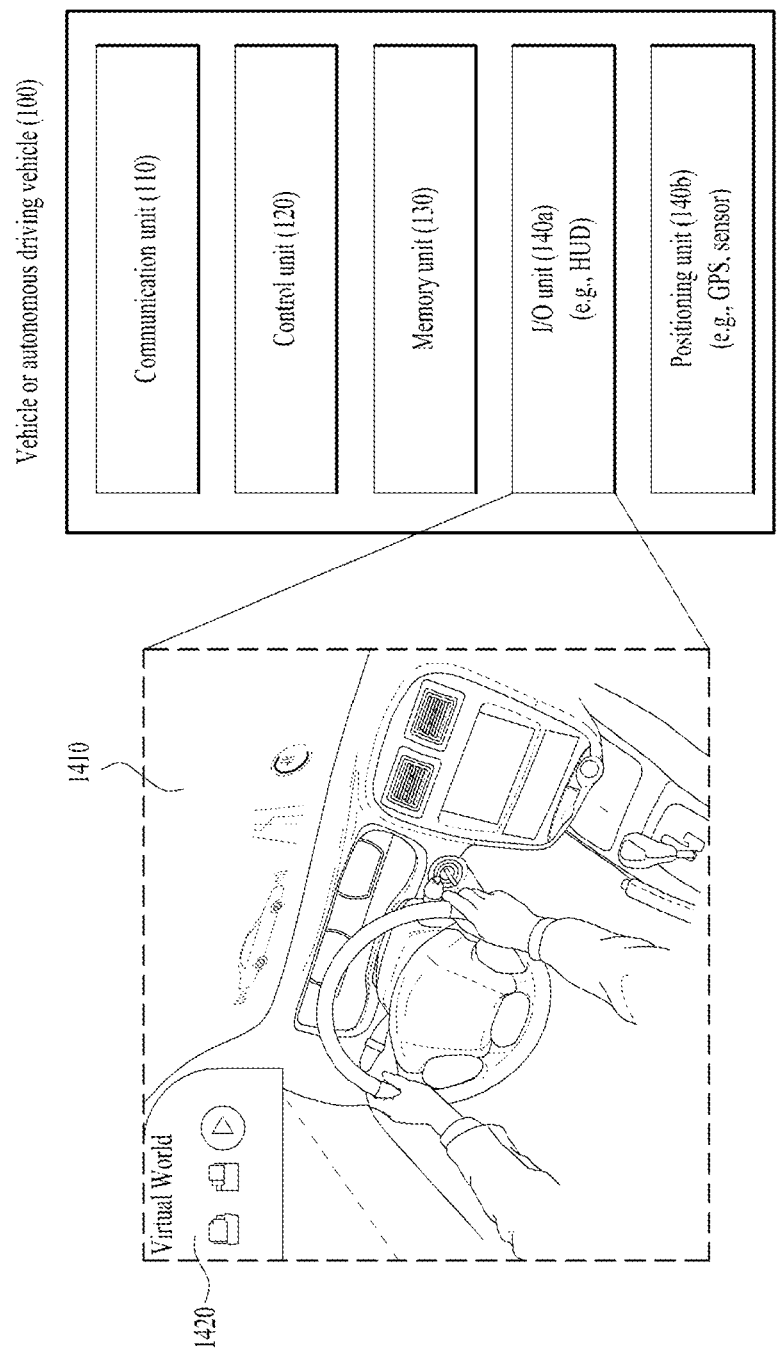
FIG. 38 is a block diagram illustrating a vehicle applied to various embodiments of the present disclosure.

4.2.5. Example of AR/VR and Vehicle to which Various Embodiments of the Present Disclosure FIG. 38 illustrates an exemplary vehicle to which various embodiments of the present disclosure are applied. The vehicle may be implemented as a transportation means, a train, an aircraft, a ship, or the like.

Referring to FIG. 38, a vehicle 100 may include a communication unit 110, a control unit 120, a memory unit 130, an I/O unit 140*a*, and a positioning unit 140*b*. Herein, the blocks 110 to 130/140*a* and 140*b* correspond to blocks 110 to 130/140 of FIG. 35.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The various embodiments of present disclosure are applicable to various wireless access systems including a 3GPP system, and/or a 3GPP2 system. Besides these wireless access systems, the various embodiments of the present disclosure are applicable to all technical fields in which the wireless access systems find their applications. Moreover, the proposed method can also be applied to mmWave communication using an ultra-high frequency band.

What is claimed is:

1. A method performed by a user equipment (UE) in a wireless communication system, the method comprising:
    transmitting a message-A comprising a physical random access channel (PRACH) preamble and a physical uplink shared channel (PUSCH); and
    receiving a message-B comprising a random access response (RAR) in response to the message-A,
    wherein the PRACH preamble is transmitted in at least one PRACH occasion from among PRACH occasions,
    wherein the PUSCH is transmitted in at least one PUSCH occasion from among PUSCH occasions that are consecutive in a frequency domain and a time domain,
    wherein the PRACH preamble is obtained from among at least one preconfigured PRACH preamble,
    wherein at least one index of the at least one PRACH preamble is mapped to the at least one PUSCH occasion in ascending order, and
    wherein a time offset as a number of slot is configured via system information, and a start slot of the at least one PUSCH occasion is determined based on the time offset from a slot of the at least one PRACH occasion.

2. The method according to claim 1, wherein the at least one index of the at least one PRACH preamble is mapped to the at least one PUSCH occasion in ascending order based on at least one of:
    (i) the PUSCH occasions being frequency-multiplexed in the frequency domain being considered in ascending order, or
    (ii) the PUSCH occasions being time-multiplexed in the time domain being considered in ascending order.

3. The method according to claim 2, wherein (i) after the PUSCH occasions frequency-multiplexed in the frequency domain are considered in ascending order, (ii) the PUSCH occasions time-multiplexed in the time domain are considered in ascending order.

4. An apparatus configured to operate in a wireless communication system, the apparatus comprising:
    a memory storing instructions; and
    at least one processor coupled with the memory and configured to execute the instructions to perform operations comprising:
    transmitting a message-A comprising a physical random access channel (PRACH) preamble and a physical uplink shared channel (PUSCH); and
    receiving a message-B comprising a random access response (RAR) in response to the message-A,
    wherein the PRACH preamble is transmitted in at least one PRACH occasion from among PRACH occasions,
    wherein the PUSCH is transmitted in at least one PUSCH occasion from among PUSCH occasions that are consecutive in a frequency domain and a time domain,
    wherein the PRACH preamble is obtained from among at least one preconfigured PRACH preamble,
    wherein at least one index of the at least one PRACH preamble is mapped to the at least one PUSCH occasion in ascending order, and wherein a time offset as a number of slot is configured via system information, and a start slot of the at least one PUSCH occasion is determined based on the time offset from a lot of the at least one PRACH occasion.

5. The apparatus according to claim 4, wherein the at least one index of the at least one PRACH preamble is mapped to the at least one PUSCH occasion in ascending order based on at least one of:
(i) the PUSCH occasions being frequency-multiplexed in the frequency domain being considered in ascending order, or
ii) the PUSCH occasions being time-multiplexed in the time domain being considered in ascending order.

6. The apparatus according to claim 5,
wherein (i) after the PUSCH occasions frequency-multiplexed in the frequency domain are considered in ascending order, (ii) the PUSCH occasions time-multiplexed in the time domain are considered in ascending order.

7. The apparatus according to claim 4, wherein the apparatus is configured to communicate with at least one of a mobile terminal, a network, or an autonomous vehicle other than a vehicle comprising the apparatus.

8. A method performed by a base station (BS) in a wireless communication system, the method comprising:
receiving a message-A comprising a physical random access channel (PRACH) preamble and a physical uplink shared channel (PUSCH); and
transmitting a message-B comprising a random access response (RAR) in response to the message-A,
wherein the PRACH preamble is received in at least one PRACH occasion from among PRACH occasions,
wherein the PUSCH is received in at least one PUSCH occasion from among PUSCH occasions that are consecutive in a frequency domain and a time domain,
wherein the PRACH preamble is obtained from among at least one preconfigured PRACH preamble,
wherein at least one index of the at least one PRACH preamble is mapped to the at least one PUSCH occasion in ascending order, and
wherein a time offset as a number of slot is configured via system information, and a start slot of the at least one PUSCH occasion is determined based on the time offset from a slot of the at least one PRACH occasion.

9. An apparatus configured to operate in a wireless communication system, the apparatus comprising:
a memory storing instructions; and
at least one processor connected to the memory and configured to execute the instructions to perform operations comprising:
receiving a message-A comprising a physical random access channel (PRACH) preamble and a physical uplink shared channel (PUSCH); and
transmitting a message-B comprising a random access response (RAR) in response to the message-A,
wherein the PRACH preamble is received in at least one PRACH occasion from among PRACH occasions,
wherein the PUSCH is received in at least one PUSCH occasion from among PUSCH occasions that are consecutive in a frequency domain and a time domain,
wherein the PRACH preamble is obtained from among at least one preconfigured PRACH preamble,
wherein at least one index of the at least one PRACH preamble is mapped to the at least one PUSCH occasion in ascending order, and
wherein a time offset as a number of slot is configured via system information, and a start slot of the at least one PUSCH occasion is determined based on the time offset from a slot of the at least one PRACH occasion.

* * * * *